United States Patent [19]

Dezonno et al.

[11] Patent Number: 5,526,416
[45] Date of Patent: Jun. 11, 1996

[54] AUTOMATIC CALL DISTRIBUTION SYSTEM WITH AN ISDN COMPATIBLE CALL CONNECTION SYSTEM AND METHOD

[76] Inventors: Anthony J. Dezonno, 2225 Midhurst Rd., Downers Grove, Ill. 60516; Richard S. Surma, 5216 Pennywood Dr., Lisle, Ill. 60532; Thomas S. Holtaway, 245 Spring Ave., Glen Ellyn, Ill. 60137

[21] Appl. No.: 976,630

[22] Filed: Nov. 16, 1992

[51] Int. Cl.⁶ .................................................. H04M 3/00
[52] U.S. Cl. ............................ 379/265; 379/266; 379/201
[58] Field of Search ................................. 379/67, 88, 127, 379/142, 77, 164, 162, 34, 112, 137, 100, 158, 96, 158, 94, 93, 215, 201, 202, 209, 210, 211, 212, 214, 265, 266, 309, 216, 221; 370/62, 110.1

[56] References Cited

U.S. PATENT DOCUMENTS

| | | | |
|---|---|---|---|
| 4,672,663 | 6/1987 | Tomasi | 379/214 |
| 4,741,026 | 4/1988 | Baxter et al. | 379/158 |
| 4,873,717 | 10/1989 | Davidson et al. | 379/164 |
| 5,008,930 | 4/1991 | Gawrys et al. | 379/210 |
| 5,172,408 | 12/1992 | Petty et al. | 379/215 |
| 5,291,492 | 3/1994 | Andrews et al. | 379/202 |
| 5,333,133 | 7/1994 | Andrews et al. | 379/210 |

*Primary Examiner*—Jeffery A. Hofsass
*Assistant Examiner*—Scott Wolinsky

[57] ABSTRACT

An automatic call distributor system (28) with an automatic call distributor (20) for selectively interconnecting telephonic calls from external telephonic units (32) of an external telephonic network (34) to a plurality of Integrated Services Digital Network (ISDN) interior telephonic units (30) with ISDN characteristics and a microprocessor (50) in the ISDN telephonic unit (30) for controlling the ISDN telephonic unit (30) to alter and enhance performance characteristics of the ISDN telephonic unit (30) in an automatic call distribution environment.

30 Claims, 19 Drawing Sheets

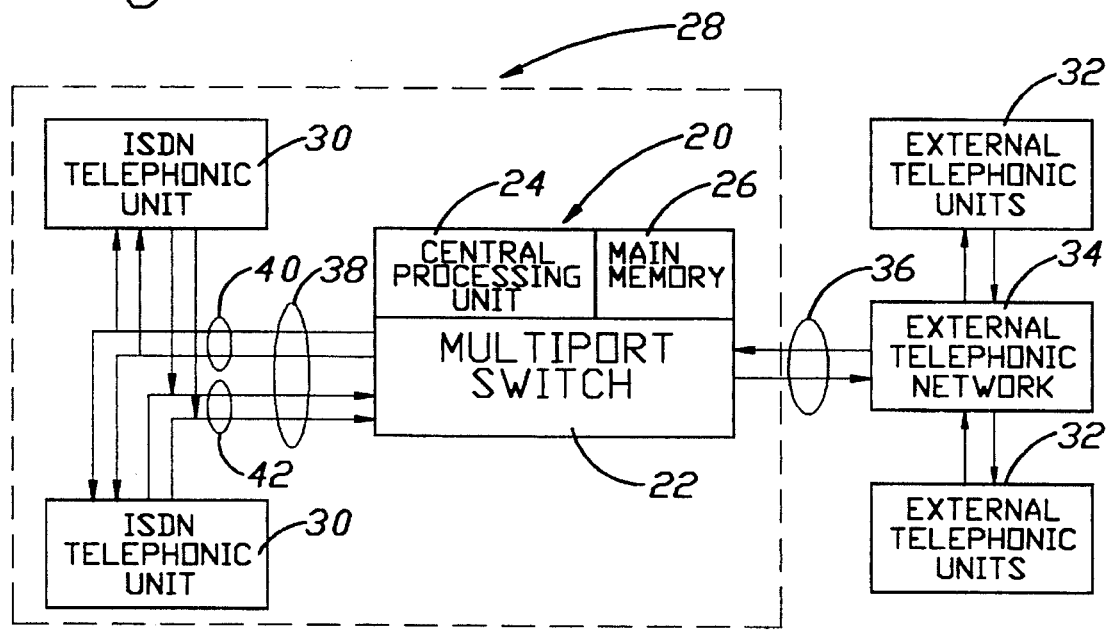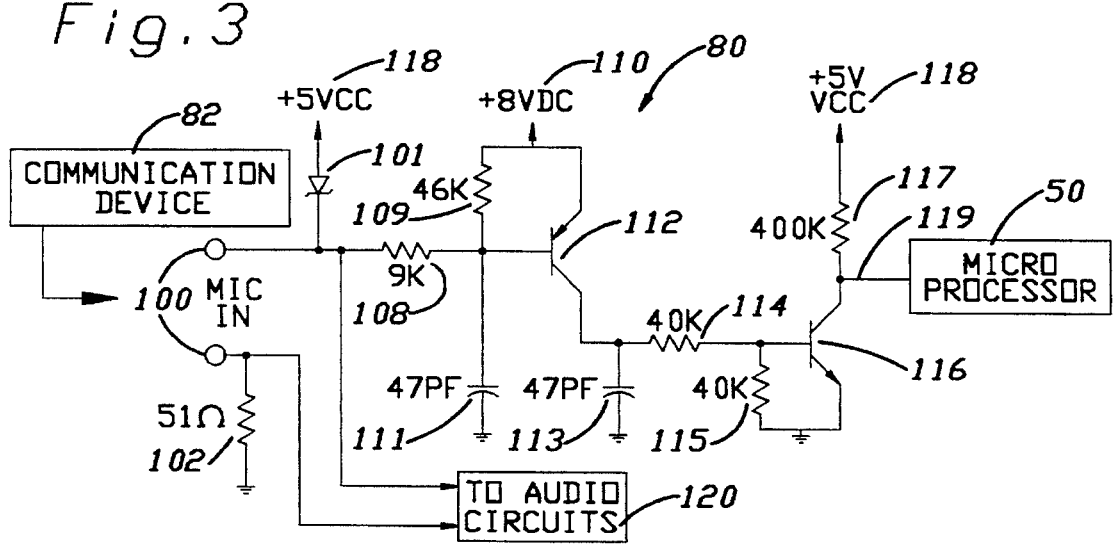

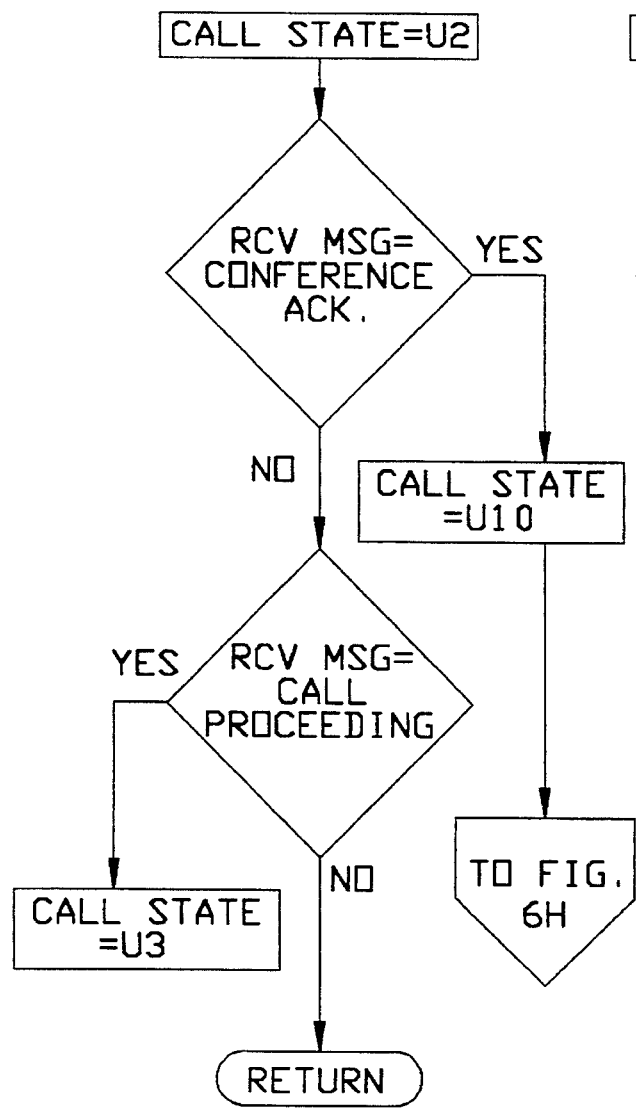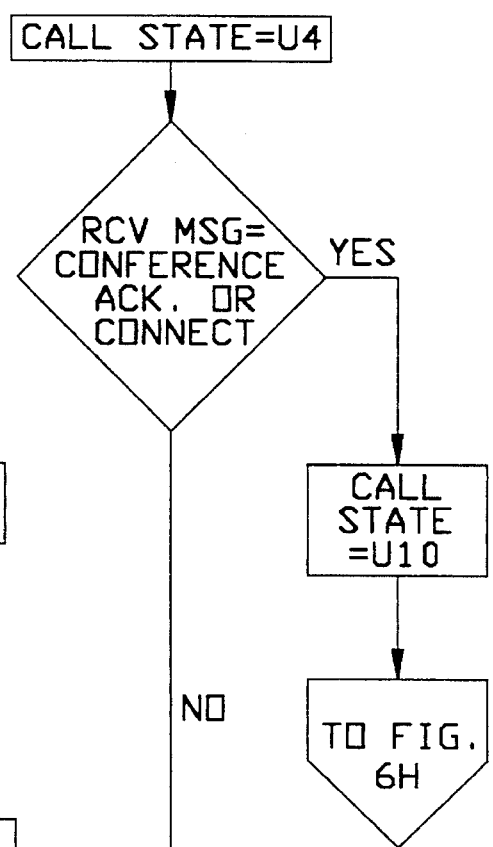

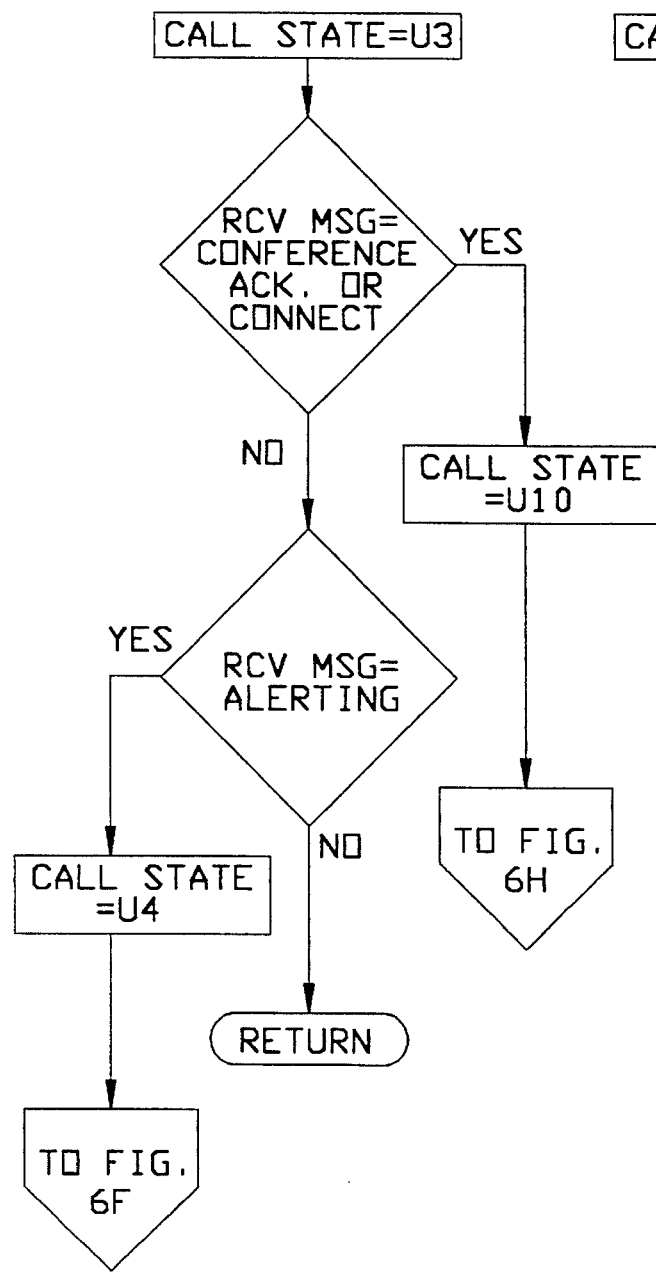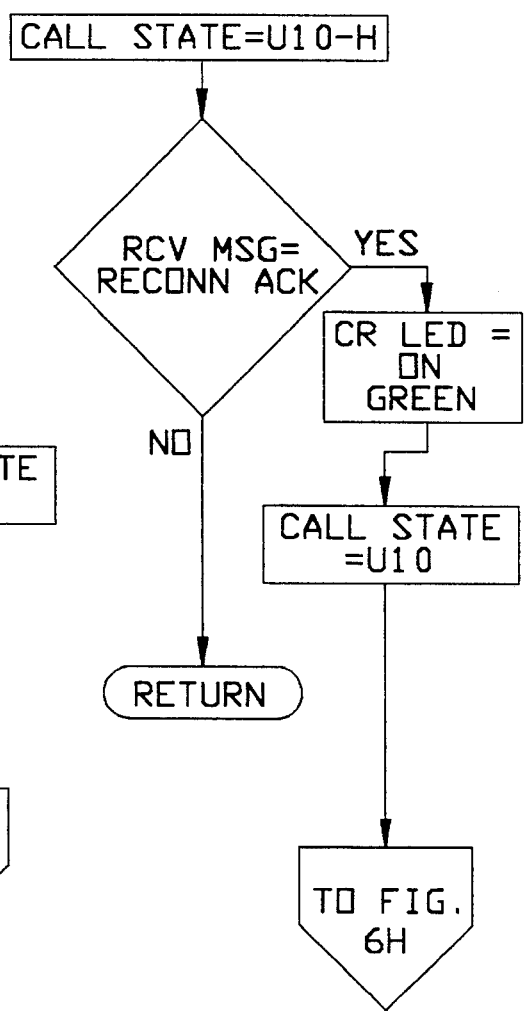
Fig. 6G
Fig. 6I

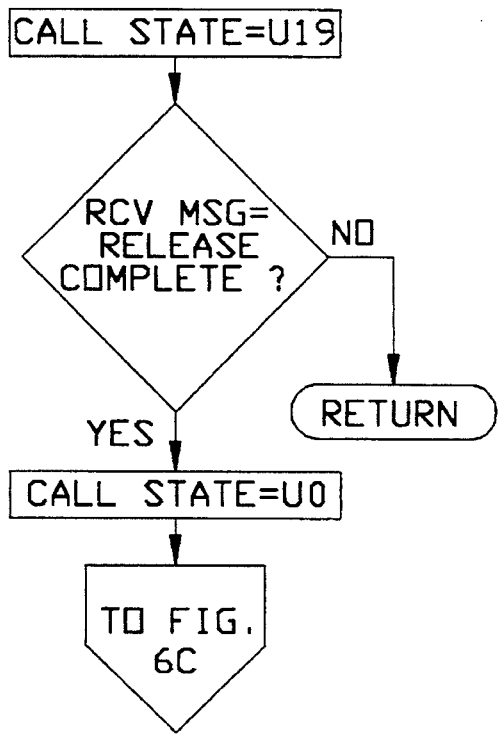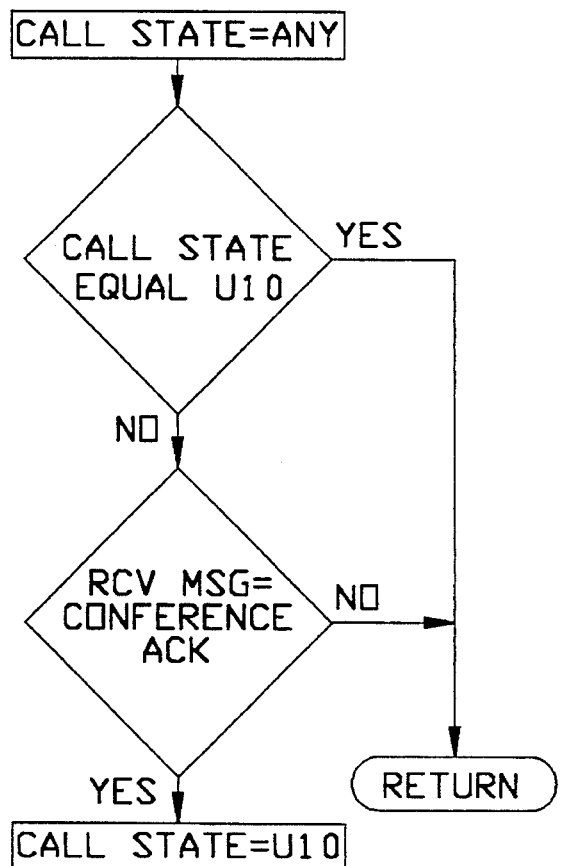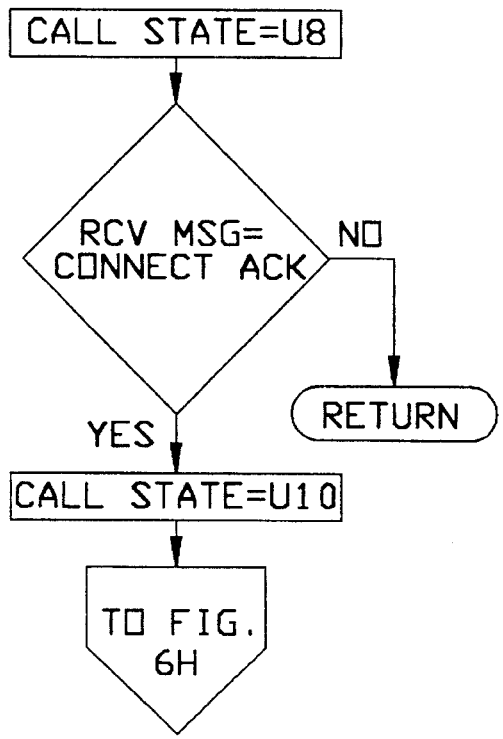

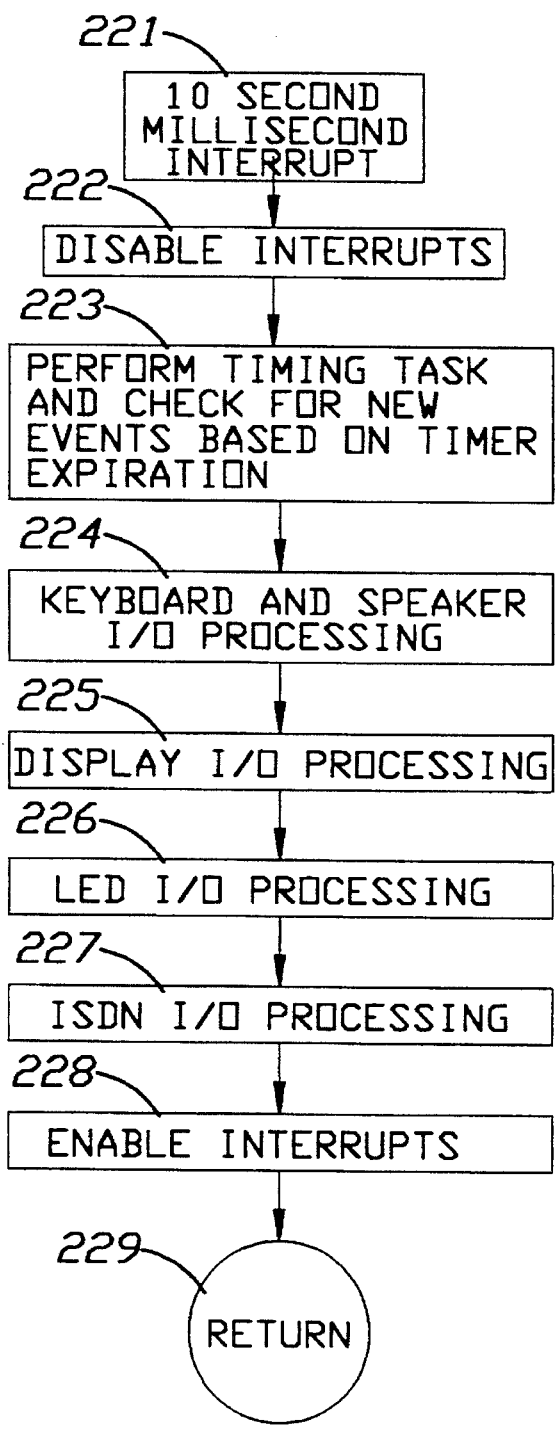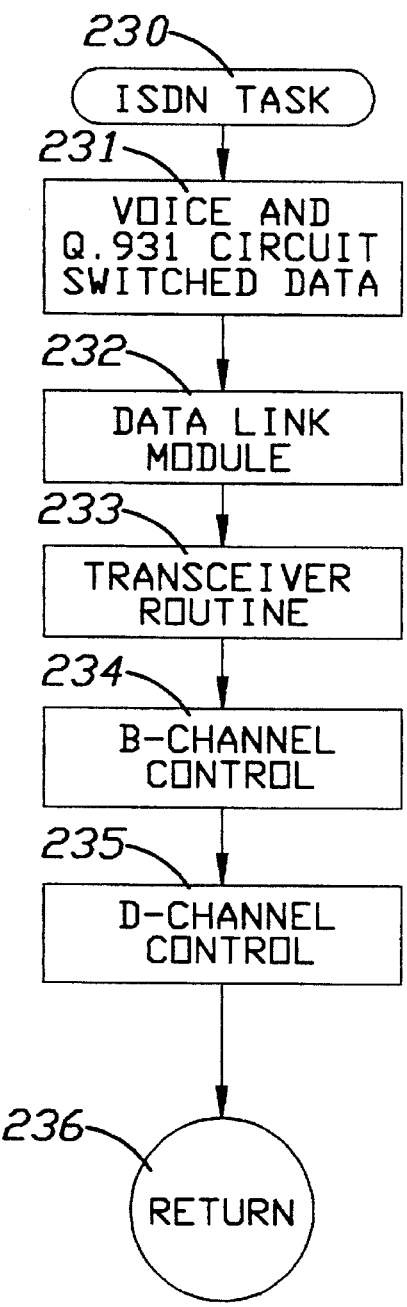

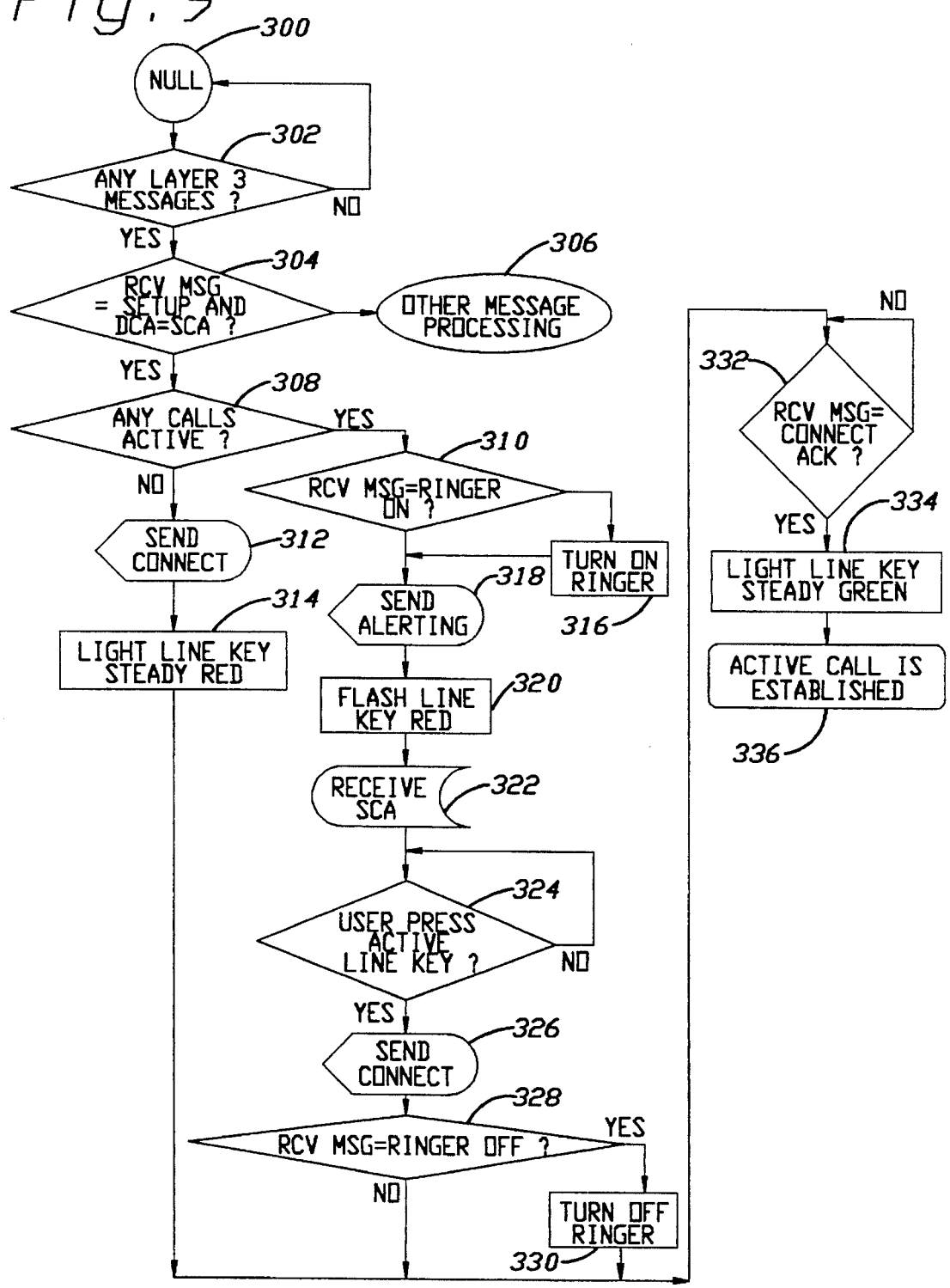

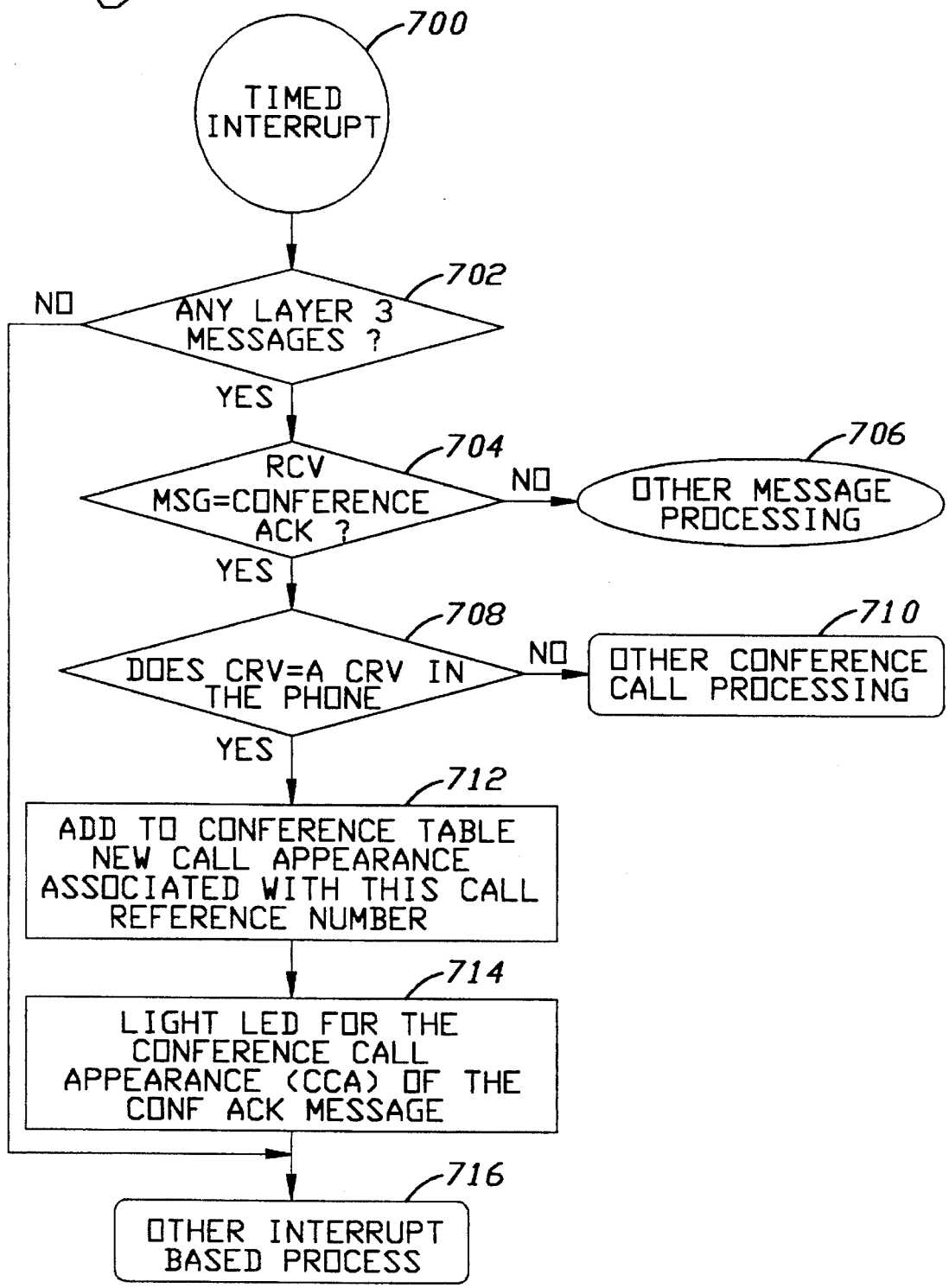

AUTOMATIC CALL DISTRIBUTION SYSTEM WITH AN ISDN COMPATIBLE CALL CONNECTION SYSTEM AND METHOD

BACKGROUND OF THE INVENTION

1. Field of the Invention

This invention relates generally to the field of automatic call distribution systems.

2. Description of the Prior Art

Automatic call distribution systems employing a multiport switch controlled by a central processing unit for selectively interconnecting a plurality of external telephonic units of an external telephonic network with internal telephonic units of the call distribution system are well known. Examples of such call distributor systems are shown in U.S. Pat. No. 5,268,903 of Jones et al. entitled "Multichannel Telephonic Switching Network With Different Signaling Formats and Cross Connect/PBX Treatment Selectable For Each Channel", issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992.

However, it has not been known in such automatic call distribution systems to employ standardized internal telephonic units, such as Integrated Services Digital Network based, or ISDN, telephonic units. Instead, such systems have employed special telephonic units especially adapted for automatic call distribution systems. Integrated Services Digital Network (ISDN) is a telephony service which connects telephone users digitally to ISDN based telephone switching equipment.

Integrated Services Digital Network provides for a signal service that supports many forms of signal traffic on a single platform. ISDN offers standardized interfaces that support speech, low-speed and high-speed data and video traffic carried on a digital signaling system. The international standards for ISDN based telephonic equipment originated by the Comité Consultatif Internationale de Télégraphique et Téléphonique (International Telegraph and Telephone Consultive Committee) or CCITT. CCITT is an agency of the International Telecommunication Union (ITU), which is an agency of the UN. The CCITT provides worldwide coordination for telephone and data communications systems. The technical recommendations of the CCITT regarding ISDN have become internationally recognized standards. The ISDN standards originated from the CCITT have been adapted to meet the needs of various telephonic companies such as American Telephone and Telegraph, Northern Telecom, NEC, Fujitsu, and Telrad.

This standard service provides ISDN users the flexibility to purchase ISDN hardware from other manufacturers to use in an ISDN telephonic system. From a design standpoint, ISDN offers standardized ISDN based integrated circuits for implementation in telephonic units. The compactness of these integrated circuits saves valuable space in the electronics packaging for the telephonic unit housing. Users not implementing ISDN based equipment must develop their own equipment which is designed to meet the needs of to each individual user.

ISDN Basic Rate Interface (BRI) is a service which directly connects to a ISDN telephonic unit of a user. The telephone equipment used communicates both digital information about the call as well as voice information over two twisted wiring pairs, one pair for receive and one pair for transmit to the telephone switching equipment. The information is formatted according to international standards as a series of three channels on each ISDN BRI line. There are two bearer B-channels at 64 kbs and one signalling D-channel at 16 kbs in the basic rate line. A B-channel is either voice or data from the user. The D-channel is used to communicate call control messages between the telephonic unit and the switching equipment. The physical type of BRI line used with on-premise switching equipment is called an S interface. The standards for the S-interface provide for up to eight telephones for connection to a twisted wiring pair.

ISDN software and hardware are informally referred to and divided into three logical layers. Layer 1 is the physical layer and provides the standard to physically interconnect telephonic equipment of different ISDN vendors. Clock synchronization, line powering, and even the physical connectors used are specified at this layer. Layer 2 is known as the data layer and provides a software interface into layer 1. Layer 2 also handles the transmission of data between telephone equipment and a telephonic switching system and management of all message error detection and correction. If an error occurs during transmission of data between the switch and the phone, layer 2 may reattempt sending the message or may notify the next layer, layer 3, that the transmission of data was unsuccessful. Layer 3 is the application layer, and it is here where call control messages are generated and interpreted. For example, messages are sent by a telephonic unit in layer 3 to specify a telephone key press by a user, or by the telephone switching equipment, to put alphanumeric characters into a liquid crystal display of the telephonic unit.

Standard ISDN layer 3 protocols provided by companies such as AT&T and Northern Telecom, address the requirements of the Private Branch Exchange (PBX) market, but lack essential requirements for automatic call distribution systems. These requirements include minimal call setup time, selective telephonic ringing, selective elimination of the requirement of lifting a handset off-hook to answer an incoming call, simplified conference call control, avoidance of call connection to unattended operator units and general minimization of the number of key actuations needed to perform frequently performed operations.

Because the standard ISDN protocols lack such functionality, the resultant inefficiency resulting from use of ISDN telephone in an automatic call distributor (ACD) environment has precluded their effective use in such applications. But for the lack of functionality, the economics of scale, standardization and other advantages of using ISDN telephones could be obtained.

The ACD environment requires that operators stationed at telephonic units be utilized in a time efficient manner in servicing telephone calls, while standard ISDN protocol incompatibility requires numerous sets of data messages to be sent between a multiport switch and a telephonic unit in order to answer a telephone call. An ACD environment requires the quick answering of calls at an internal telephonic unit given the high volume of calls presented to agents servicing the calls at the telephonic units. The speed to answer a telephonic call significantly effects the number of calls which are answered during a day. Disadvantageously, standard ISDN protocol requires that telephonic calls to be answered through use of a switchhook of the telephonic unit to change state in order for a telephonic call to be sent to the telephonic unit.

In an automatic call distribution environment, such as in the telemarketing industry, thousands of calls from a single user are taken daily. Since 1-800, or toll free, calls charge the receiver of the call for the period a call is handled, the extra amount of time required to lift a telephone handset from a switchhook for each and every call becomes prohibitively expensive over time. A problem exists with standard ISDN telephonic units, since they require the use of a switchhook or some other external signaling means for a telephonic unit to accept an incoming call. It is imperative in an ACD environment to reduce the amount of time an operator or agent spends to service a call in order to permit more calls to be taken over a period of time. Thus, a need is created which allows incoming callers to be immediately connected to an operator of an ISDN based telephonic device when the operator is not active on another call.

Known ISDN based telephonic units do not meet the special requirements for an automatic call distribution environment, since such units unacceptably enable operators at any time to enter into a telephonic unit customizing mode. This creates a security problem, since telephonic unit default settings are changeable, such as different types of ringing, loudness of the ring, etc. Moreover, in an ACD environment, thousands of calls are serviced daily, and operators or agents are tempted to enter into the telephonic unit customizing mode in which no calls can be placed to their unit in order to take unauthorized work breaks. This problem increases the amount of unauthorized break time by unproductive operators and consequently permits fewer calls to be taken over a period of time.

Agents or operators in an ACD environment must use the communication devices for communicating through the telephonic unit. It is therefore important that the telephonic unit detect when audio communication devices, headsets or handsets, are not plugged into the unit so that the automatic call distributor does not transfer calls to a telephonic unit where the agent has unplugged their headset or handset and has left the unit unattended. Disadvantageously, known ISDN telephonic units do not provide a means for detecting the removal of a communication device from a unit and therefore cannot be caused to automatically preclude distribution of calls to an unattended telephonic unit.

Known ISDN based telephonic units require the unit to audibly ring in order to indicate a call to an operator. Disadvantageously, in an ACD environment, audible ringing in a single room fitted with a multitude of ISDN telephonic units creates a noisy and distracting work environment for the ACD operators. However, under certain circumstances, such as when an operator is across a room from a telephonic unit, it may be desirable to have the telephonic unit ring. Additionally, it is also desirable that a ringing element be activated when an operator is servicing a connected call on another line. Ringing at a telephonic unit is also useful to alert an operator when the ACD system is writing an important message to a liquid crystal message display on the unit. It is also beneficial for the system to alert an operator as to the arrival of a display message when a call is not present. Standard ISDN telephonic units do not allow selective ringing of the telephone unit, but rather ring always and only upon, the initial arrival of an incoming call.

Known ISDN based systems allow for the creation of calls between multiple parties, typically referred to as conference calls. These calls are controlled by only one operator (primary operator) who generates call connections. It is desirable to allow a secondary operator (such as a supervisor) of a primary operator the ability to automatically be joined into an existing conversation while the primary operator is actively conversing on a call. However, in these ISDN systems these calls do not meet the special requirements for an automatic call distributor environment, since the known ISDN based telephonic units cannot connect a secondary operator to an existing conversation automatically as a result of actions taken by the secondary operators.

Other desirable conference calling features are inachievable with the use of an ISDN telephone, such as the ability to place one of the conferencing parties on hold while continuing the conference between the remaining parties and then selectively removing them from hold, and for indicating, or acknowledging, when parties have joined the conference and to selectively drop parties from the conference with the actuation of a single key.

SUMMARY OF THE INVENTION

It is therefore the principal object of the present invention to provide an automatic call distribution system which employs ISDN telephones and related apparatus and methods for overcoming the foregoing disadvantages of ISDN characteristics by controlling the ISDN telephonic units to operate in accordance with altered characteristics which enhance their performance in an ACD environment.

This object is achieved in part through provision of an automatic call distribution system having an automatic call distributor for selectively interconnecting calls from external telephonic units of an external telephonic network unit with the system with an ISDN compatible call connection system, comprising a plurality of ISDN interior telephonic units with ISDN characteristics connected with the call distributor for receipt of incoming calls from the external telephonic units and means for controlling the ISDN interior telephonic units to selectively alter some of their performance characteristics to enhance their performance in a call distribution environment.

Also, the objective is achieved in an automatic call distribution system with an automatic call distributor for selectively interconnecting calls from external telephonic units of an external telephonic network unit with the system by providing a method of making ISDN compatible call connections with the interior telephonic units, comprising the steps of providing each of the plurality of interior telephonic units with ISDN characteristics and controlling the ISDN interior telephonic units to selectively alter at least some of the ISDN characteristics to enhance performance in a call distribution system.

Obtainment of the objective is also obtained in an automatic call distribution system having a computer controlled multiport switch for selectively interconnecting a plurality of telephonic units of an internal telephonic network with external telephonic units of an external telephonic network by providing an ISDN compatible call connection system, comprising means for providing the interior telephonic units with ISDN characteristics to make them ISDN units, means associated with the ISDN telephonic units for automatically indicating to the computer controlled multiport switch that the ISDN telephonic unit is in an idle state ready to take an incoming call, means for selectively, automatically connecting incoming calls through the switch to those ISDN telephonic units that are providing indications they are in an idle state and means at the ISDN telephonic units in the idle state for automatically accepting the incoming calls selectively and automatically connected thereto through the switch by said automatically connecting means.

The objective is further achieved by provision of an automated call distribution system having a computer controlled multiport switch for selectively interconnecting a plurality of internal ISDN telephonic units with a plurality of incoming calls from external telephonic units with an ISDN compatible call connection system, comprising means for providing the interior telephonic units with ISDN characteristics to make them ISDN units, means for determining whether the internal telephonic units are in an active state in which they are not ready to receive a call immediately or in an idle state in which they are ready to receive a call immediately, means responsive to the determining means for selectively interconnecting incoming calls to internal telephonic units determined to be in an idle state in accordance with an ISDN standard communications protocol and means responsive to the determining means for interconnecting incoming calls to the internal telephonic units determined to be idle in accordance with a protocol different from the ISDN standard protocol.

The objective is further achieved in an automated call distribution system having a computer controlled multiport switch for selectively interconnecting a plurality of internal ISDN telephonic units with a plurality of incoming calls from external telephonic unit with a method of making ISDN compatible call connections with the interior telephonic units, comprising the steps of (1) providing the interior telephonic units with ISDN characteristics to make them ISDN units, (2) determining whether the internal telephonic units are in an active state in which they are not ready to receive a call immediately or in an idle state in which they are ready to receive a call immediately, (3) selectively interconnecting incoming calls to internal telephonic units determined to be in an idle state in accordance with an ISDN standard communications protocol and (4) interconnecting incoming calls to the internal telephonic units determined to be idle in accordance with a protocol different from the ISDN standard protocol.

Further achievement of the objective is acquired in an automatic call distribution system for selectively interconnecting telephonic calls received from external telephonic units of an external telephonic network to interior telephonic units with hook switches of the automatic call distribution system by providing an ISDN compatible call disconnection system, comprising means for providing the interior telephonic units with ISDN characteristics to make them ISDN units, means for disconnecting telephonic calls at an interior ISDN telephonic unit received from an external telephonic unit, means responsive to the disconnecting means for automatically indicating to the automatic call distributor that the ISDN telephonic units are in an off-hook state independently of actuation of hook switches and means responsive to actuating the indicating means for directly connecting calls from the external telephonic units to the ISDN telephonic unit independently of actuation of hook switches.

The objective is additionally obtained in an automatic call distribution system having a call distributor for selectively interconnecting telephonic calls from external telephonic units of an external telephonic switching network with a plurality of internal telephonic units each having a releasably connectable audio communication device by providing an ISDN compatible call connection system, comprising means for providing the interior telephonic units with ISDN characteristics to make them ISDN units, means at the internal ISDN telephonic units for detecting disconnection of an audio communication device from the ISDN telephonic units, means responsive to the detecting means for transmitting a message which indicates disconnection of the headset from one of the ISDN telephonic units to the automatic call distributor in accordance with the ISDN protocol and means at the automatic call distributor responsive to said messages from the ISDN telephonic units for preventing the interconnection of incoming telephonic calls to the internal ISDN telephonic units at which the headset is disconnected.

The objective is also obtained in part by providing in an automatic call distribution system having a call distributor for selectively interconnecting telephonic calls from external telephonic units of an external telephonic switching network with a plurality of internal telephonic units each having a releasably connectable audio communication device with a method of making ISDN compatible call connections with the interior telephonic units, comprising the steps of (1) providing the interior telephonic units with ISDN characteristics to make them ISDN units, (2) detecting disconnection of an audio communication device from the ISDN telephonic units, (3) transmitting a message which indicates disconnection of the audio communication device from one of the ISDN telephonic units to the automatic call distributor in accordance with the ISDN protocol and (4) preventing the interconnection of incoming telephonic calls to the internal ISDN telephonic units at which the audio communication device is disconnected.

Obtaining the objective preferably is obtained in an automatic call distribution system having a computer controlled multiport switch for selectively interconnecting a plurality of internal telephonic units with a plurality of external telephonic units of an external telephonic switching network by providing an ISDN call connection system, comprising means for providing the interior telephonic units with ISDN characteristics, means for creating a conference call between at least two external telephonic units and an ISDN internal telephonic unit and means associated with the ISDN internal telephonic unit for placing one of the external telephonic units on hold with a single key actuation while maintaining the conference call between a remaining ISDN internal telephonic unit and the connected external telephonic unit.

Also, acquirement of the objective is achieved in an automatic call distributor having a computer controlled multiport switch for selectively interconnecting a plurality of internal telephonic units with a plurality of external telephonic units of an external telephonic switching network by providing a method of making ISDN compatible call connections with the interior telephonic units, comprising the steps of providing the interior telephonic units with ISDN characteristics, creating a conference call between at least two external telephonic units and an ISDN internal telephonic unit and placing one of the external telephonic units on hold with a single key actuation while maintaining the conference call between a remaining ISDN internal telephonic unit and the connected external telephonic unit.

The objective is moreover acquired by providing in an automatic call distributor system having a multiport switch for selectively interconnecting a plurality of external telephonic units of an external switching network to a plurality of internal telephonic units of the call distribution system, an ISDN call connection system, comprising means for providing the interior telephonic unit with ISDN characteristics to make them ISDN units, means at the ISDN internal telephonic units for establishing a multiple party telephonic conference call, means associated with the ISDN internal telephonic units for placing one of the parties to a telephonic conference call on hold and means associated with the ISDN internal telephonic units for acknowledging the ability to reconnect the party placed on hold to the multiple party conference call.

Moreover, the objective is obtained in part in an automatic call distributor system having a multiport switch for selectively interconnecting a plurality of external telephonic units of an external switching network to a plurality of internal telephonic units of the call distribution system, by using a method of making ISDN compatible call connections with the interior telephonic units, comprising the steps of providing the interior telephonic unit with ISDN characteristics to make them ISDN units, establishing a multiple party telephonic conference call, placing one of the parties to the telephonic conference call on hold and acknowledging the ability to reconnect the party placed on hold to the multiple party conference call.

Acquisition of the objective is acquired in part in an automatic call distribution system with a computer controlled multiport switch for selectively interconnecting a plurality of external telephonic units of an external telephonic switching network with a plurality of internal telephonic units of the call distribution system, through means of provision of an ISDN compatible call connection system, comprising means for providing the interior telephonic unit with ISDN characteristics to make them ISDN units, means for connecting a two way voice path from an ISDN internal telephonic unit to an existing incoming telephonic call between one external telephonic unit and another ISDN internal telephonic unit to create a conference call and means responsive to the connecting means for indicating at the other ISDN internal telephonic unit of creation of the two way voice path connection from the one ISDN internal telephonic unit with the existing incoming telephonic call connection.

Obtainment of the objective is also acquired in an automatic call distribution system having a computer controlled multiport switch for selectively interconnecting a plurality of external telephonic units of an external telephonic switching network with a plurality of internal telephonic units of the call distribution system, by provision of a method of making ISDN compatible call connections with the interior telephonic units, comprising the steps of providing the interior telephonic unit with ISDN characteristics to make them ISDN units, connecting a two way voice path from an ISDN internal telephonic unit to an existing incoming telephonic call between one external telephonic unit and another ISDN internal telephonic unit to create a conference call and indicating at the other ISDN internal telephonic unit of creation of the two way voice path connection from the one ISDN internal telephonic unit to the existing incoming telephonic call connection.

Also, obtaining the objective of the invention, provision is made in an automatic call distribution system having a switch for selectively interconnecting a plurality of external telephonic units of an external telephonic switching network with a plurality of internal telephonic units of the call distribution system, for an ISDN compatible call connection system, comprising means for providing the interior telephonic units with ISDN characteristics to make them ISDN telephonic units, means for connecting multiple parties to an ISDN internal telephonic unit to establish a multiple party conference call at the ISDN internal telephonic units between the external telephonic units and other ISDN internal telephonic units and means responsive to actuation of a single key associated with the ISDN internal telephonic unit for disconnecting all the connected parties to the internal telephonic unit.

The objective is also acquired by provision in an automatic call distribution system having a switch for selectively interconnecting a plurality of external telephonic units of an external telephonic switching network with a plurality of internal telephonic units of the call distribution system of a method of making ISDN compatible call connections with the interior telephonic units, comprising the steps of providing the interior telephonic units with ISDN characteristics to make them ISDN telephonic units, connecting multiple parties to an ISDN internal telephonic unit to establish a multiple party conference call at the ISDN internal telephonic units between the external telephonic units and other ISDN internal telephonic units and disconnecting all the connected parties to the internal telephonic unit.

Still obtaining the objective of the invention is provision of an automatic call distribution system having a multiport switch for selectively interconnecting a plurality of external telephonic units of an external telephonic network with internal telephonic units of the automatic call distribution system of an ISDN compatible call connection system, comprising means for providing the interior telephonic units with ISDN characteristics to make them ISDN interior telephonic units, means for preventing the activation of a ringer at the internal telephonic units and means for activating the ringers in response to receipt of a telephonic calls from the multiport switch to the internal telephonic units in an unavailable state.

Finally, the objective of the invention is achieved by providing in an automatic call distribution system having a multiport switch for selectively interconnecting a plurality of external telephonic units of an external telephonic network with internal telephonic units of the automatic call distribution system, a method of making ISDN compatible call connections with the interior telephonic units, comprising the steps of providing the interior telephonic units with ISDN characteristics to make them ISDN interior telephonic units, preventing the activation of a ringer at an internal telephonic unit and activating the ringer in response to receipt of a telephonic call from the multiport switch to the internal telephonic unit in an unavailable state.

BRIEF DESCRIPTION OF THE DRAWINGS

The foregoing objects and advantageous features will be explained in greater detail and other objects, features and advantages will be made apparent from the following detailed reference to the several figures of the drawing, in which:

FIG. 1 is a functional block diagram of the automated call distribution system as connected with an external telephonic network;

FIG. 3 is a generalized component schematic of the communication device detection circuit of the ISDN telephonic unit of FIG. 2;

FIGS. 6A–6L are flow charts illustrating the call sequencing in the ISDN telephonic unit for the execution of call state progression of ISDN messages received from the automatic call distributor;

FIG. 7 is a flow chart of the scheduler routine run by the microprocessor of the ISDN telephonic unit of FIG. 2;

FIG. 8 is a flow chart of the basic steps for performance of an ISDN task;

FIG. 9 is a flow chart of the particular section of the preferred computer programs stored in the EPROM of the ISDN based telephonic unit of FIG. 2 for selective nonringing immediate connection of an incoming call to an ISDN telephonic unit;

FIG. 13 is a flow chart for the particular section of the preferred computer programs stored in the EPROM of the ISDN based telephonic unit of FIG. 2 for enabling a secondary operator to create a multiple party conference type call in an automated fashion regardless of the call state.

DESCRIPTION OF THE PREFERRED EMBODIMENT

Figure 2:
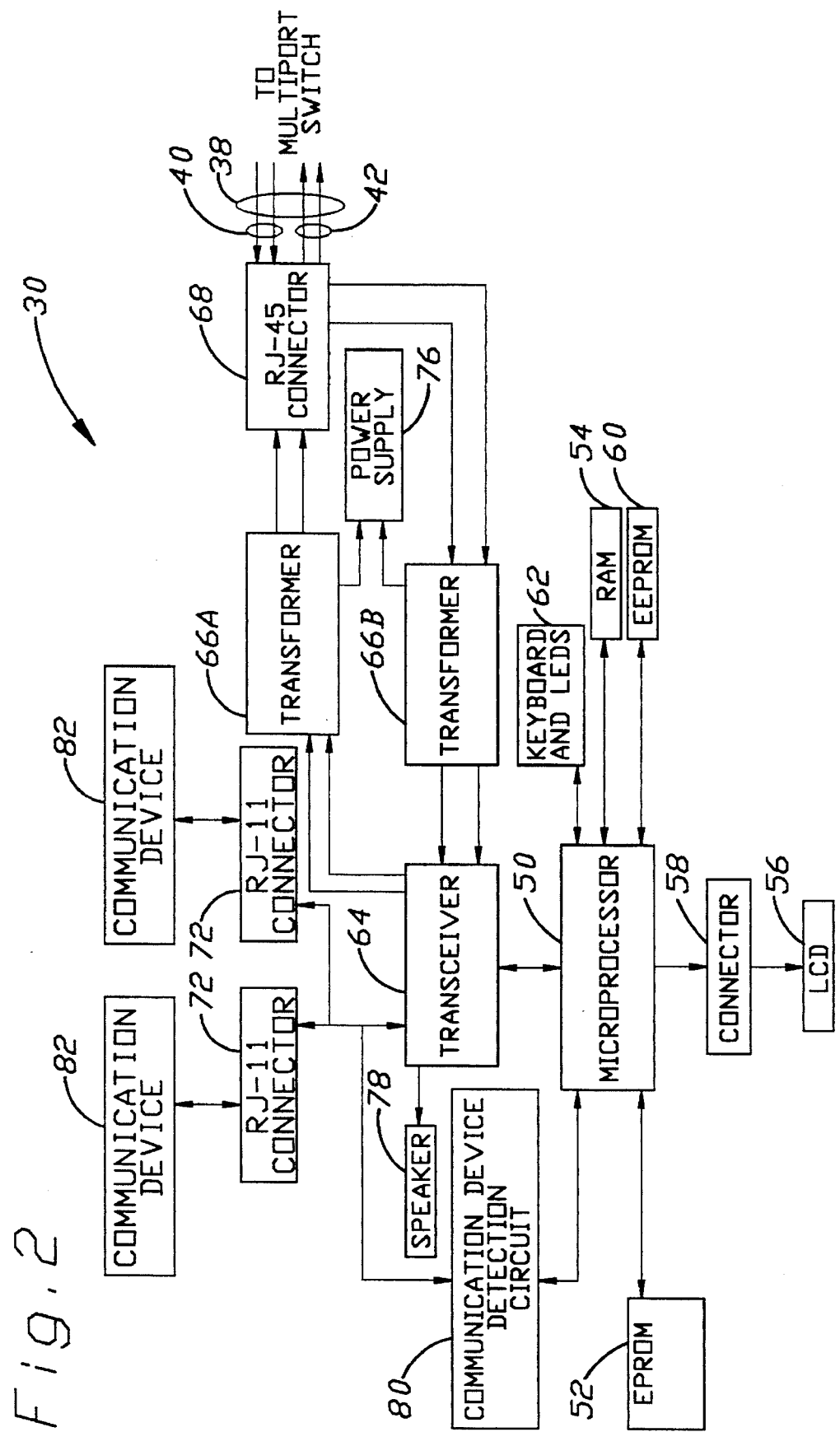
FIG. 2 is a functional block diagram of the ISDN internal telephonic unit of FIG. 1.

Referring to FIG. 1, the automatic call distributor 20 having a multiport switch 22 controlled by a central processing unit 24 in conjunction with a main memory 26 for selectively interconnecting a plurality of external telephonic units 32 of an external telephonic network 34 with a plurality of Integrated Services Digital Network (ISDN) based interior telephonic units 30 of the automated call distributor system 28. The multiport switch 22 of the automatic call distributor (ACD) 20 connects with the external telephonic network 34 over standard telephonic interface lines or trunks 36. The automatic call distributor 20 determines which ISDN telephonic units 30 receive telephonic calls made from the external telephonic units 32 of the external telephonic network 34 and other internal ISDN telephonic units 30 of the automated call distribution system 28. Examples of such call distributor systems are shown in U.S. Pat. No. 5,268,903 of Jones et al. entitled "Multichannel Telephonic Switching Network With Different Signaling Formats and Cross Connect/PBX Treatment Selectable For Each Channel", issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992.

The multiport switch 22 of the ACD 20 connects to the ISDN interior telephonic units 30 over a four wire interface 38. Two of the wires 40 are for the receipt of digitized voice and digital signaling data of a telephonic call received at an ISDN telephonic unit 30, and the two other wires 42, of the four wire interface 38, are for the transmission of voice and data information from the ISDN telephonic unit 30 to the ACD 20. The interface between the plurality of ISDN telephonic units 30 and the ACD 20 in the preferred embodiment is an ISDN "S" type Basic Rate Interface (BRI).

Multiple ISDN telephonic units are connectable to a single BRI four wire interface line 38; however in an automatic call distributor 20 environment as seen in the preferred embodiment in FIG. 1, the number of ISDN telephonic units 30 on a single BRI line 38 is limited to two units 30. Both of the two ISDN telephonic units 30 are connected to a single BRI line 38 in a parallel manner.

Referring now to FIG. 2, the functional block diagram of an ISDN telephonic unit 30 of the preferred embodiment of the present invention is shown to include a microprocessor 50 for control of the unit functions. The microprocessor 50 used in the preferred embodiment is an 8031 manufactured by Intel Corporation for execution of program code described in detail in FIGS. 5 through 13 and stored in the Erasable programmable read-only memory (EPROM) 52, FIG. 2, of the ISDN telephonic unit 30. The EPROM 52 used in the preferred embodiment has storage capacity of 64K bytes of memory. The program code stored in the EPROM 52 contains the software routines for controlling and monitoring the ISDN telephonic feature applications described in FIGS. 9–13. The microprocessor 50 is connected to a volatile RAM 54 having 8K of memory for the storage of temporary data, such as ISDN messages received from the automatic call distributor 20, FIG. 1, to be processed by the microprocessor 20, FIG. 1, and processed by the microprocessor 20, FIG. 2. The 8K RAM 54 temporarily stores information for display on the liquid crystal display (LCD) of the telephonic unit 30. The microprocessor 50 places alphanumeric characters of the LCD 56 of the ISDN telephonic unit 30 by writing characters to the LCD through a ribbon cable wiring connection 58 between the microprocessor 50 and the LCD. The wiring connection 58 provides for communication between the microprocessor 50 and the LCD 56 located on separate circuit boards in the preferred embodiment. The LCD 56 displays the characters received from the microprocessor 50 for view by agents or operators at the ISDN telephonic unit 30.

A nonvolatile memory or EEPROM 60 is used for storage of the telephonic unit 30 configuration settings. The microprocessor 50 sends the configuration settings received from ACD messages or entered through a keyboard by the agent or operator at the telephonic unit 30, such as the contrast of the LCD 56, into the EEPROM 60 for storage. The nonvolatile EEPROM stores the configuration settings to remain present even upon loss of power to the ISDN telephonic unit 30.

Figure 4:
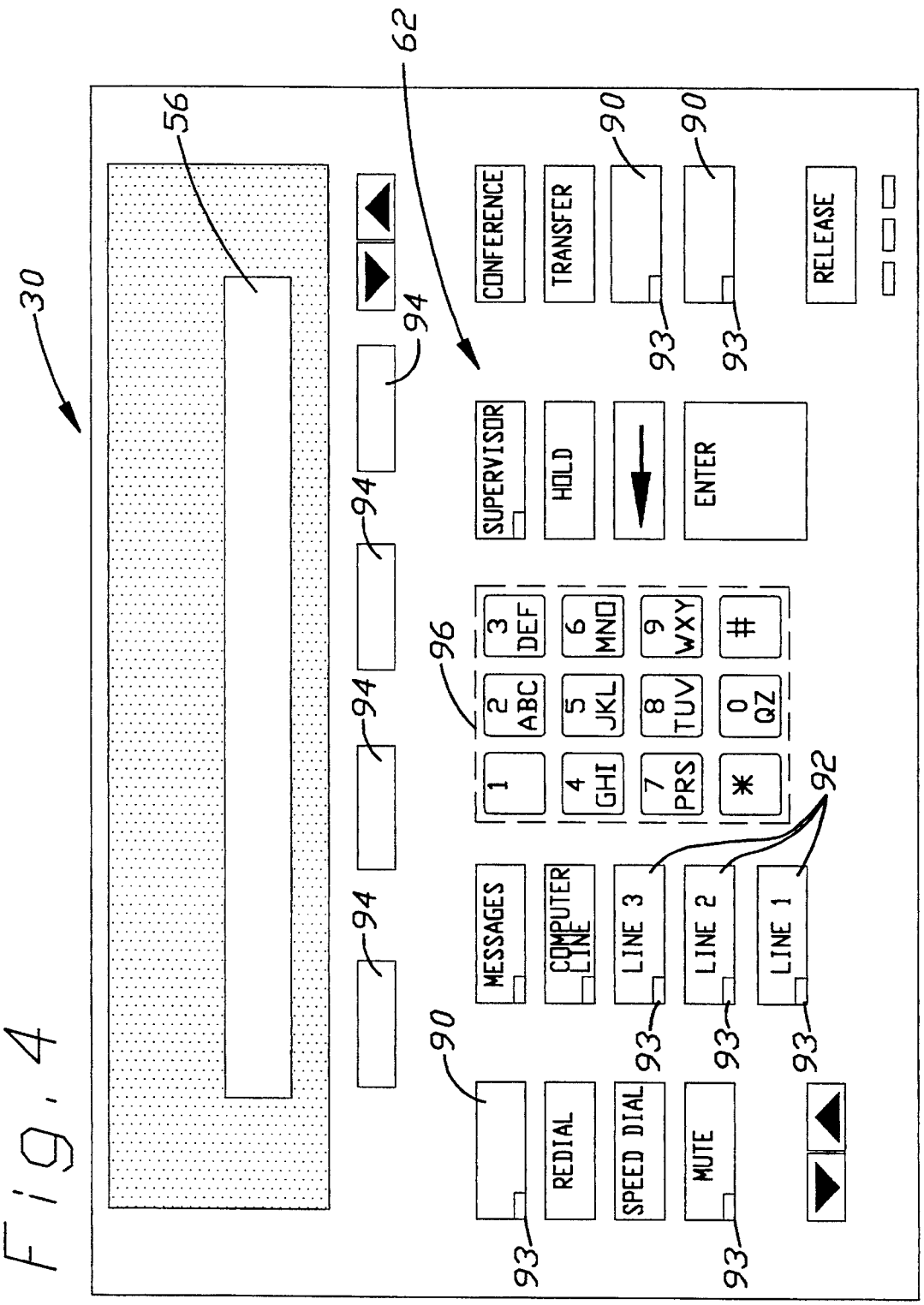
FIG. 4 is a simplified plan view of an ISDN telephonic unit of the automatic call distribution systems of FIGS. 1 and 3.

The ISDN telephonic unit 30, as seen in FIG. 4, has a set of keys 90, 92, 96, 94 on a keypad or keyboard 62 of the unit for selection of various telephonic unit functionality. The keypad 62 contains ACD specific, as well as standard numeric telephony keys 96 to place a caller on hold or to redial a phone number. The microprocessor 50, FIG. 2, monitors the keyboard 62 to determine if any key is actuated by the operator at the ISDN telephonic unit 30. In response to detecting the closure of a key 90, FIG. 4, on the keyboard 62, the microprocessor 50, FIG. 2, executes software contained in the EPROM 52 to determine that only one key is being actuated at a time and to debounce the key 90.

The microprocessor 50, FIG. 2, is connected to a standard ISDN communications integrated circuit or transceiver 64. The transceiver 64 reduces the number of components required to implement the ISDN telephonic unit 30 circuit designs since the standard transceiver contains timers, ISDN control logic, circuitry to convert the digitally encoded audio waveforms into an analog representation, and line driver circuitry needed to implement the ISDN standard. The transceiver 64 used in the preferred embodiment is a AMD79C30 integrated circuit made by Advanced Micro Devices, Inc. of Santa Clara, Calif. The AMD79C30 transceiver provides connection to the multiport switch 22, FIG. 1, of the automatic call distributor 20 through the use of two transformers 66A and 66B. The transformers 66A, 66B are connected to a single standard RJ-45 eight position connector 68 as defined by the specifications of the Comité Consultatif Internationale de Télégraphique et Téléphonique (International Telegraph and Telephone Consultive Committee) or CCITT.

The transceiver 64 converts digitally encoded voice information received from the ISDN line 38 into an analog waveform for use with an audio communication device 82 (either headsets or handsets in the preferred embodiment) connected to the telephonic unit 30. Two standard telephony RJ-11 jacks, 72, are mounted on opposite sides of the ISDN telephonic unit 30, in the preferred embodiment, to allow for connection of a communication device 82 (headset or handset) to the telephonic unit 30. The AMD79C30 transceiver 64 decodes ISDN signalling messages sent by the automatic call distributor 20, FIG. 1, on the pairs of wires 40, 42 ISDN line 38, FIG. 2, connecting with the ISDN telephonic unit 30 for interpretation of informational and channel signalling messages acted upon by the microprocessor 50.

The automatic call distributor 20 supplies 48 VDC across transmit 40 and receive wires 42 of the ISDN line 38. The ISDN telephonic unit 30 is remotely powered away from the ACD 20 through use of the CCITT Standard of the Phantom powering (PS2) methodology. A ground isolated DC-DC power supply 76 converts the 48 VDC line voltage into the voltage levels required by the telephonic unit 30. The ground isolated power supply 76 is used to prevent problems arising from differences in the ground potential at locations distant from the ACD 20, FIG. 1.

A standard loudspeaker 78, FIG. 2, connects with the ISDN transceiver 64 for the generation of tones from the ISDN telephonic unit 30. The microprocessor 50 instructs the transceiver to sequentially send digital signals to the speaker or ringer 78 to create audio tones from the speaker.

A communication device detection circuit 80 determines the connectivity status between the ISDN telephonic unit 30 and a communication device 82. The communication devices 82 employed in the preferred embodiment are headsets or handsets having an audio input (or microphone) and an audio output (or earpiece). Other alternative communication devices employed include speakers, microphones, tape recorders, etc. The communication device 82 is secured to the ISDN telephonic unit 30 through the RJ-11 connector jacks 72 and coupled with the communication device detection circuit 80. The communication device detector circuit 80 monitors the status of the RJ-11 connector 72 and signals via a polled status input line to the microprocessor 50 to indicate a change occurring in the amount of current drawn through the jacks. The communication device detection circuitry monitors the amount of DC current flowing from the connector 72 and when it exceeds a level as dictated by the circuitry design, a signal is sent to the microprocessor 50 to indicate an audio communication device 82 is inserted. If the current drawn through the connector falls below a set level, a signal is sent to the microprocessor to indicate that the communication device 82 is unplugged from the ISDN telephonic unit.

Referring now to FIG. 3, the generalized schematic diagram of the circuit used in the communication device detection circuit 80 is shown. The RJ-11 connector jacks 72, FIG. 2, electrically connect to microphone inputs, FIG. 3, 100. A five volt source 118 is used to supply current to a microphone (not shown) of the communication device 82 through a diode 101 to electrically power the communication device. A 51 ohm resistor 102 exists on one of the microphone leads providing a matching electrical impedance to the microphone communication device 82 for the audio circuitry 120 in the ISDN telephonic unit 30, FIG. 2. The leads across the diode 101 and the resistor 102 are further utilized by audio circuitry 120 inside the ISDN telephonic unit 30, FIG. 2.

The diode 101, FIG. 3, also connects to a resistor 108 for the purpose of monitoring the current drawn through the microphone connection 100. When current is flowing through the microphone connections 100, a voltage division between resistors 108 and 109 occurs which is sufficient enough to activate a PNP transistor 112. A capacitor 111 is used for filtering any noise spikes occurring as a result of the communication device 82 being inserted into the RJ-11 connectors 72, FIG. 2.

The PNP transistor 112 connects to a voltage supply 110 which provides a flow of current through a capacitor 113, and a resistor 114. The capacitor 113 is used to filter noise in the voltage supply 110. The voltage at the resistor 114 is divided across another resistor 115 connected at the base of a transistor 116. The flow of current into the transistor 116 base activates the transistor to flow current through resistor 117.

With the flow of current through the transistor 116, a low voltage appears on the line 119 which is normal at a 5 VDC potential 118 connected with the microprocessor 50, FIG. 2. This change of state sensed by the microprocessor 50 indicates the action of the communication device 82 being inserted into the ISDN telephonic unit 30. In response to an audio communication device 82 being removed from the telephonic unit 30, the line 119, FIG. 3, into the microprocessor 50, FIG. 2, goes to 5 VDC.

Referring to FIG. 4, the simplified plan view of the ISDN telephonic unit 30 is shown having a liquid crystal display 56 (LCD) mounted on the keyboard 62 of the telephonic unit 30 housing. The keyboard has a plurality of keys 90, 92, 96 for activation of the ISDN telephonic unit 30 functions upon actuation of the keys by an agent or operator at the unit. The ISDN telephonic unit 30 has standard numeric telephony keys as well as ACD function specific keys 90. The unit 30 also has a plurality of soft keys 94. The soft key 94 function is defined by the menu appearing on the LCD 56. Thus, the functionality of a soft key 94 changes as the menu changes on the LCD 56. This provides for activation of multiple functions while having only a limited number of keys in order to provide efficient use of the keyboard 62 space.

Referring now to FIGS. 5A–8, the generalized software flow of the ISDN telephonic unit is shown. The generalized structure of this embodiment is based upon the interface standards as proposed by the CCITT as is publicly known and practiced. FIGS. 9–13 detail the specific modifications to the known algorithms are shown to be unique and novel implementation towards a solution to the problems associated in the ACD environment.

The microprocessor 50, FIG. 2, utilized in the execution of the software program of the preferred embodiment is an Intel 8031 integrated circuit. The erasable programmable read only memory (EPROM) 52, FIG. 2, contains the instructions executed by the processor 50 to carry out the various functions of the ISDN telephonic unit 30 to accomplish the overall desired result. The random access memory (RAM) 54 provides the microprocessor 50 with scratch pad memory for storing transient information relating to the progress of a call in the telephonic unit 30, display information, and messages communicated with the ACD 20, FIG. 1. The RAM 54, FIG. 2 is sectioned into blocks of memory denoted as Queues each of which are associated with tasks performed by the microprocessor 50. Receiving information over the ISDN line 38, transmitting information over the ISDN line 38, displaying information to the LCD 56 of the telephonic unit 30, and the polling of the keypad 62 are examples of tasks utilizing queues to accomplish the desired function tasks of the ISDN based telephonic unit 30. Additional information such as tables which contain information elements on the activity status of each call, a unique call number to differentiate each call, fault counts for messages sent between the telephonic unit 30 and the ACD 20, FIG. 1, and other information relevant to processing are kept in the RAM 54, FIG. 2.

The events stored in the RAM 54 pertain to changes in condition relevant to the calls processed by the ISDN telephonic unit 30. Some examples of these conditions are ISDN messages received by the telephonic unit 30 from the ACD 20, FIG. 1, ISDN messages sent by the unit 30 to the ACD 20, or the expiration of a timer. These events indicate an occurrence for consideration in light of the call processing step in the sequence of operations in which a call has progressed (called the state of a call) when the event occurred. The combination of event and the current state of the call are used together to determine the actions for processing a call to the next step in a sequence of steps and also to determine the next state.

An interval timer connects internally to the microprocessor 50, FIG. 2, interrupt line (not shown) and provides the microprocessor with real time intervals of approximately 10 milliseconds. The periodic time intervals are necessary for scheduling the execution of particular tasks, and to subdivide other tasks for completion within a set period.

Figure 5A:
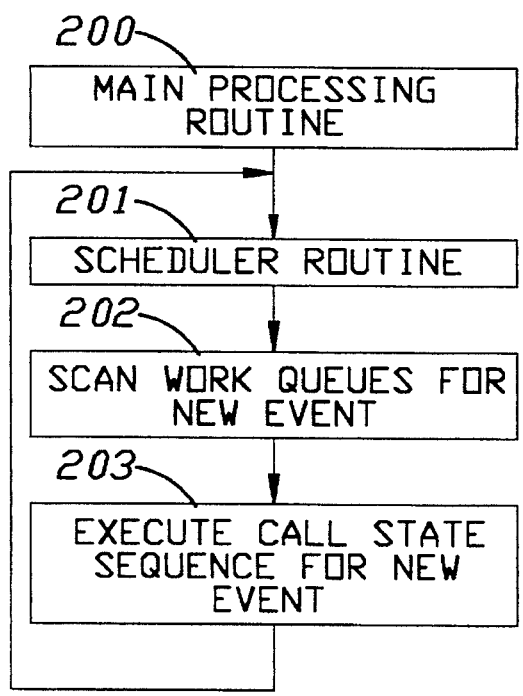
FIG. 5A is a flow chart of the base level executive program describing the basic operational steps performed by the ISDN telephonic unit in processing a telephonic call.

The sequence of steps through which the present invention undergoes in performing its function is shown in FIGS. 5A through 13. Both incoming and outgoing calls are processed by the ISDN telephonic unit 30, FIG. 1, as a series of states assigned to the call as it progresses to completion as seen in FIGS. 6A–6L. The program of the microprocessor 50, FIG. 2, includes a base level executive program as seen in FIG. 5A from which the microprocessor 50, FIG. 2, departs to execute a sequence of steps to which a call has been assigned. The base level program in FIG. 5A is the program which the microprocessor 50 is returned from the various other programs as depicted in FIGS. 6A–6L, FIG. 7, FIG. 8 and FIGS. 9–13.

Referring to FIG. 5A, the microprocessor 50, FIG. 2, executes all necessary hardware and software initializations including initialization of ISDN integrated circuits in step 200. the microprocessor 50, FIG. 2, proceeds into execute a scheduling algorithm to set timers, which when expired begins the execution of specific processing tasks in step 201. The microprocessor 50 scans the work queues for any new events in step 202 such as ISDN messages or physical devices requiring processing. If new ISDN message events are discovered by the scan, then the microprocessor 50, FIG. 2, proceeds to step 203, FIG. 5A, where call state sequencing is carried out.

Figure 5B:
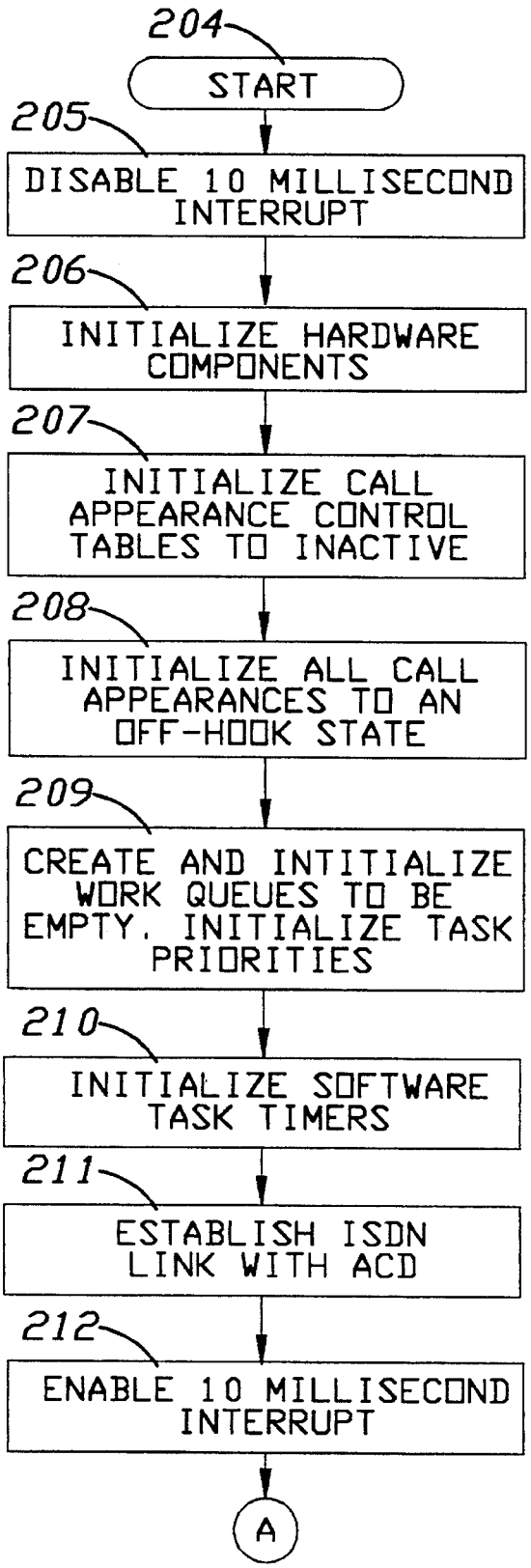
FIG. 5B and 5C are detailed flow charts of the base level executive program of FIG. 5A.

Now referring to FIG. 5B, which is a detailed description of FIG. 5A. The routine begins at step 204 from either a reset or power on condition. The 10 millisecond interrupt timer is disabled into prevent branched program flow before the hardware and software elements are initialized in step 205. Hardware components are initialized in step 206 and all call appearance values are set to be inactive since the ISDN telephonic unit 30, FIG. 2, in this condition, is not processing any calls in step 207, FIG. 5B. All call appearances are also set to the off-hook state in step 208 in order to initialize the telephonic unit 30 for use in an ACD system 28, FIG. 1, since no hookswitch exists in an ACD system.

The work queues are initialized and set to an empty state in step 209 by the microprocessor 50, FIG. 2. Priorities for any predetermined tasks for the work queue are also set in step 209. The software based timers used to signal the execution of work queue tasks are initialized in step 210.

Upon completion of the initialization of variables, the 10 millisecond interrupt timer is activated in step 211, and the microprocessor 50, FIG. 2, attempts to establish an ISDN communication with the ACD 20, FIG. 1, in step 212, FIG. 5B. Now referring to FIG. 5C, which is a continuation of FIG. 5B, program execution advances to step 213, which is figuratively labeled the null state. This section of program code is the main loop of program code for the ISDN telephonic unit 30, FIG. 1.

In step 214, the microprocessor 50, FIG. 2, checks the highest priority task work flags being set in the RAM 54 work queues. The microprocessor 50 accomplishes this task by reading the memory locations assigned to the work queue and checking the value of the flag against the value of an active flag, in step 215, FIG. 5C. If a flag of the task is not set to a high priority then a flag of lower priority is checked for the work queue until the lowest priority flag is tested in step 216.

Figure 5C:
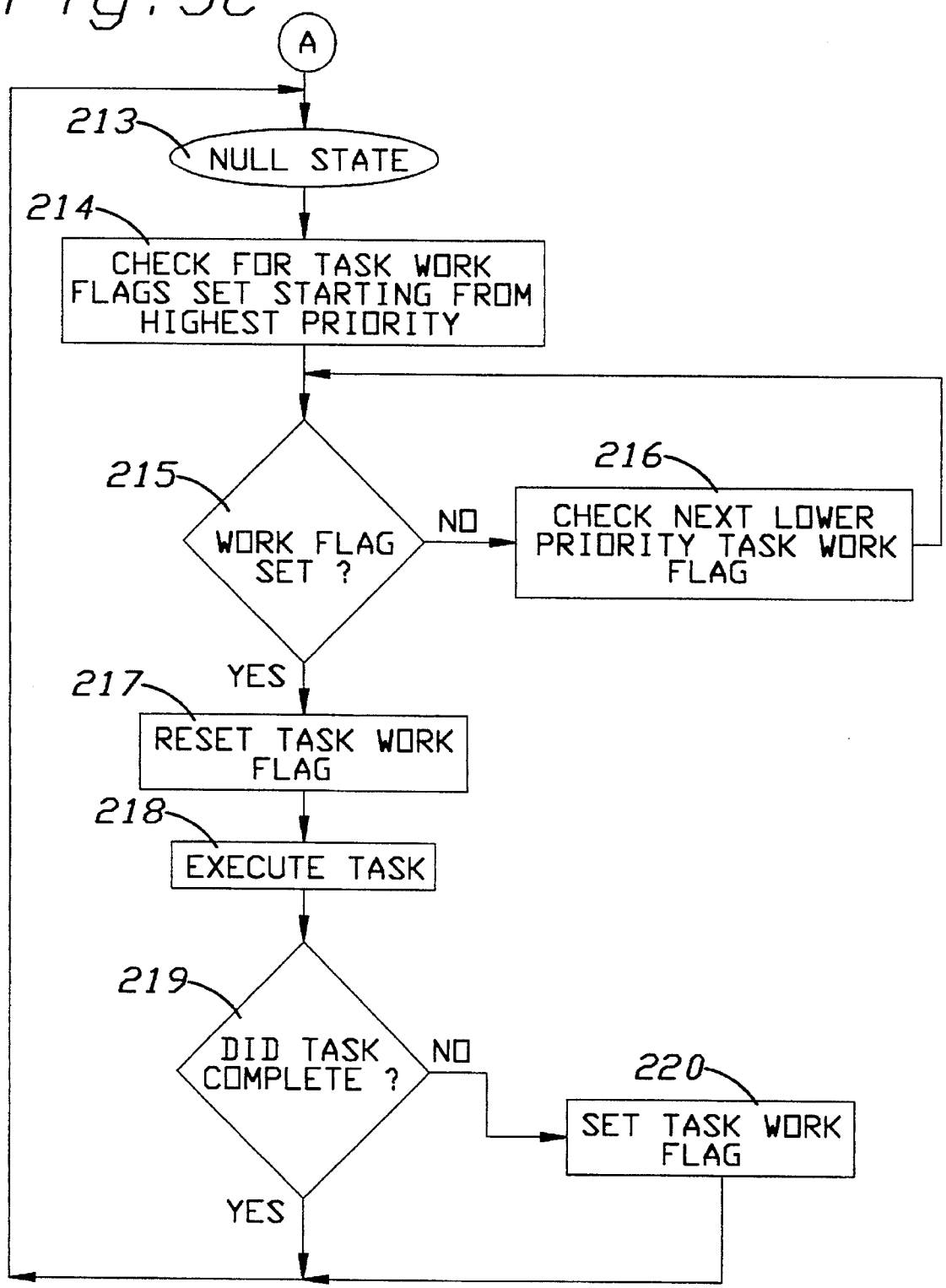

If a work flag is affirmatively set, the microprocessor 50, FIG. 2, resets the work flag in step 217, FIG. 5C, to indicate that it is executing the task in step 218. The microprocessor 50 determines if the task is complete in step 219. If the task does not complete in the time interval assigned through use of the software timers, the task work flag is set in step 220 to indicate further processing is required for the task. In either case, program execution returns to the null state in step 213.

The flow charts of FIGS. 6A–6L illustrate the principle of call sequencing in the ISDN telephonic unit 30 as described in step 203, FIG. 5A, in the execution of call state progression resulting form ISDN messages received from the ACD 20. The descriptions of the activity of the phone LED's 93, FIG. 4, are shown to further clarify the flow charts.

Figure 6A:
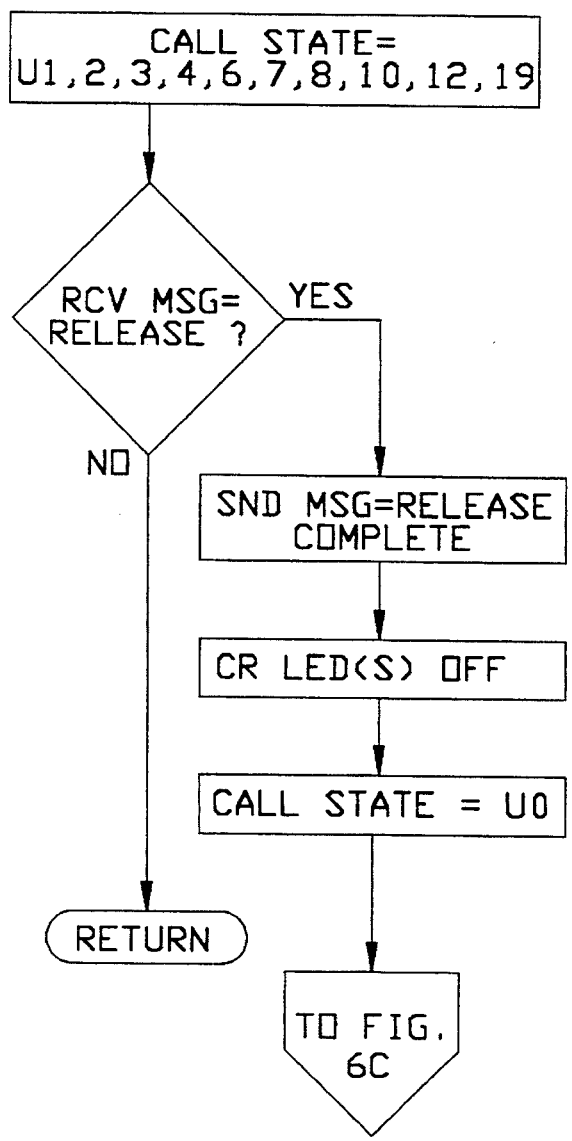
Figure 6B:
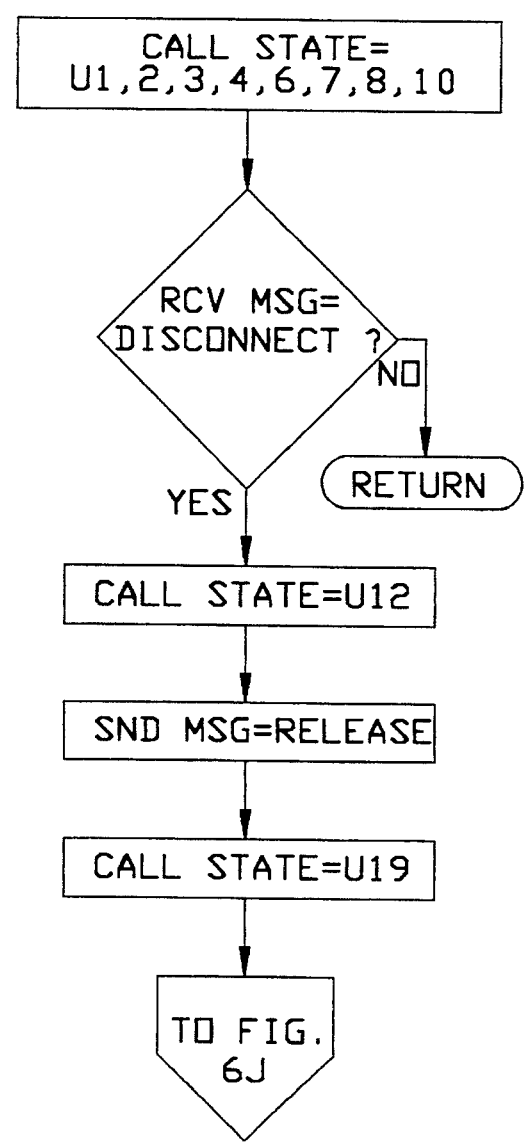
Figure 6C:
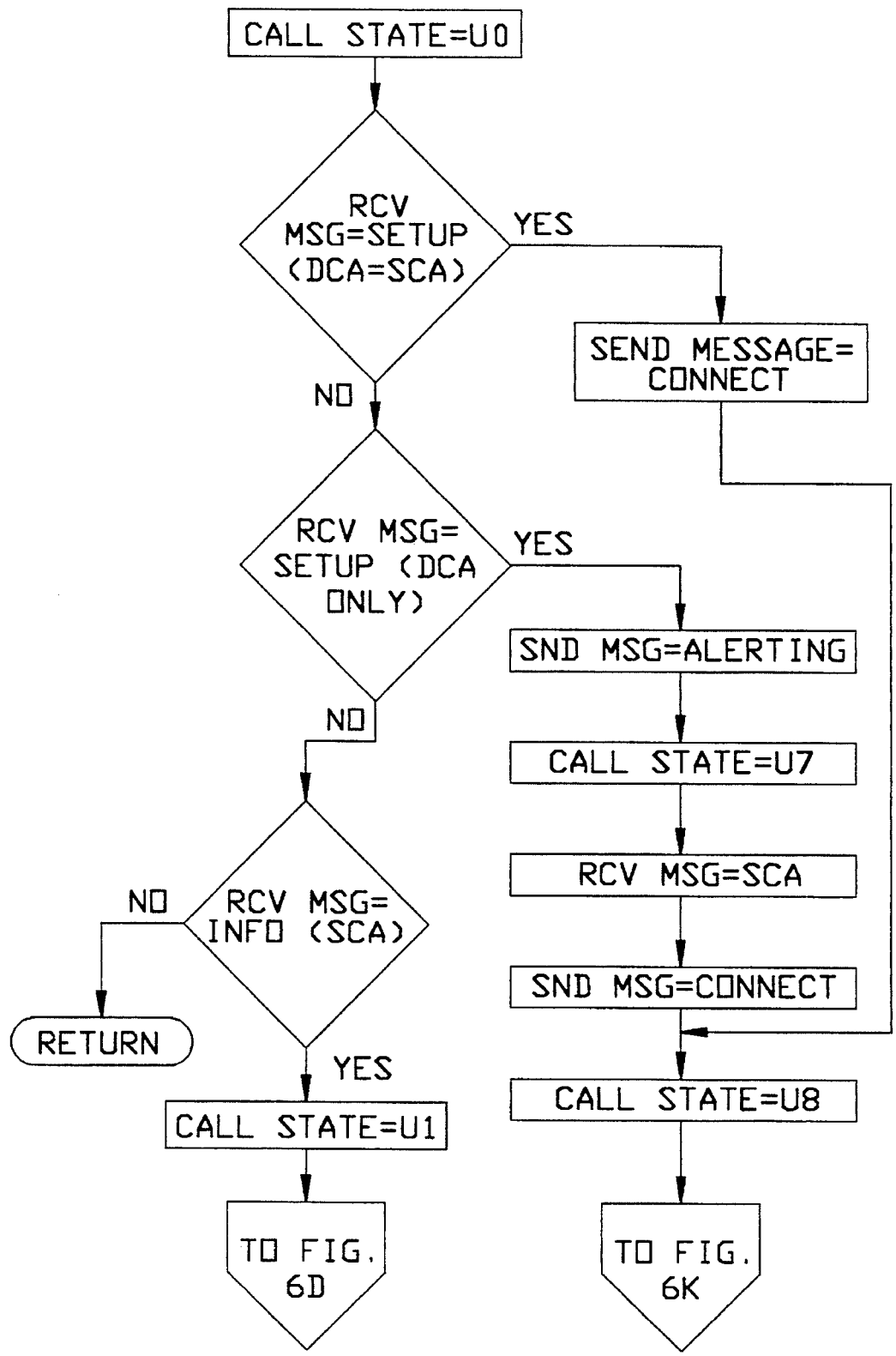
Figure 6D:
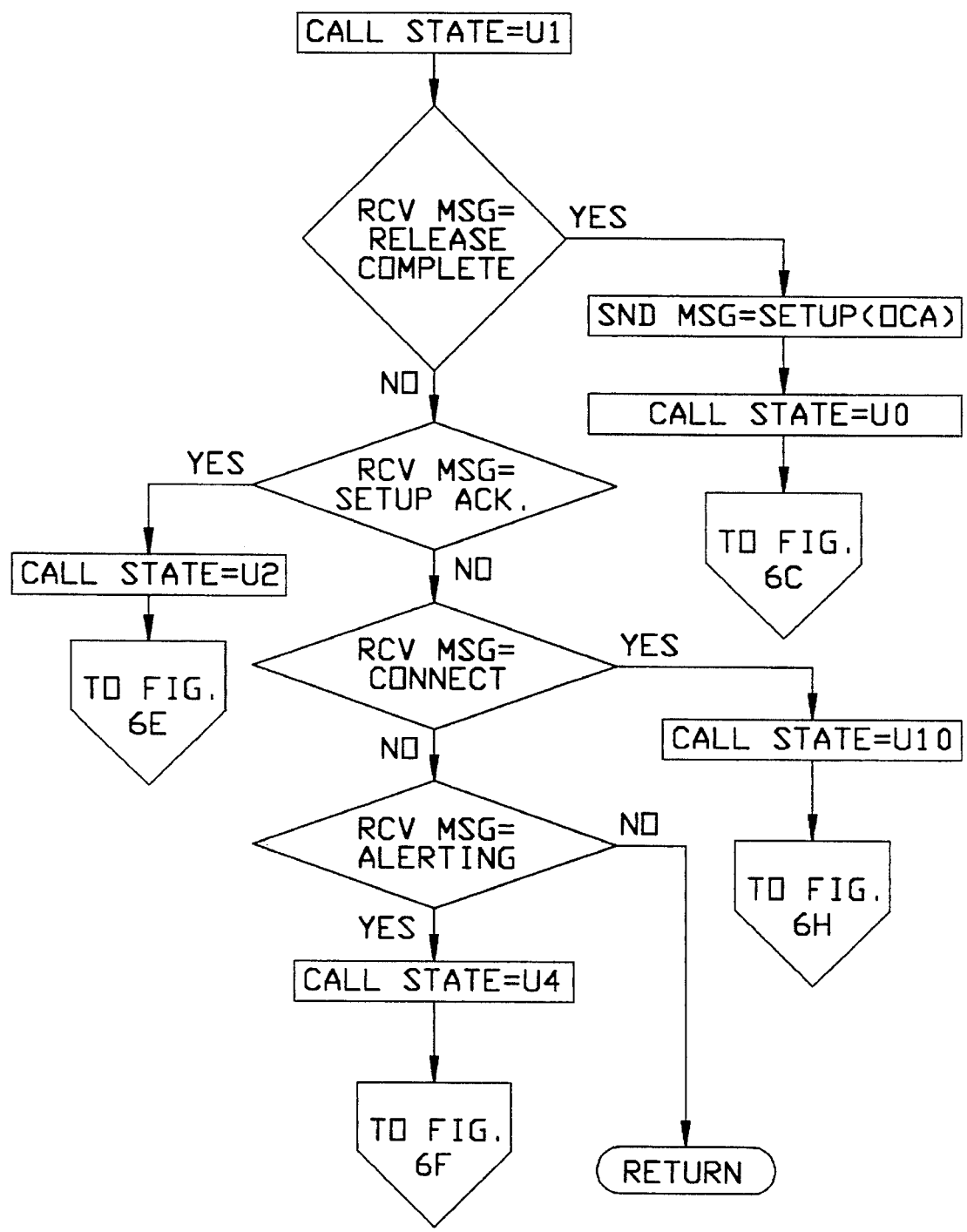
Figure 6H:
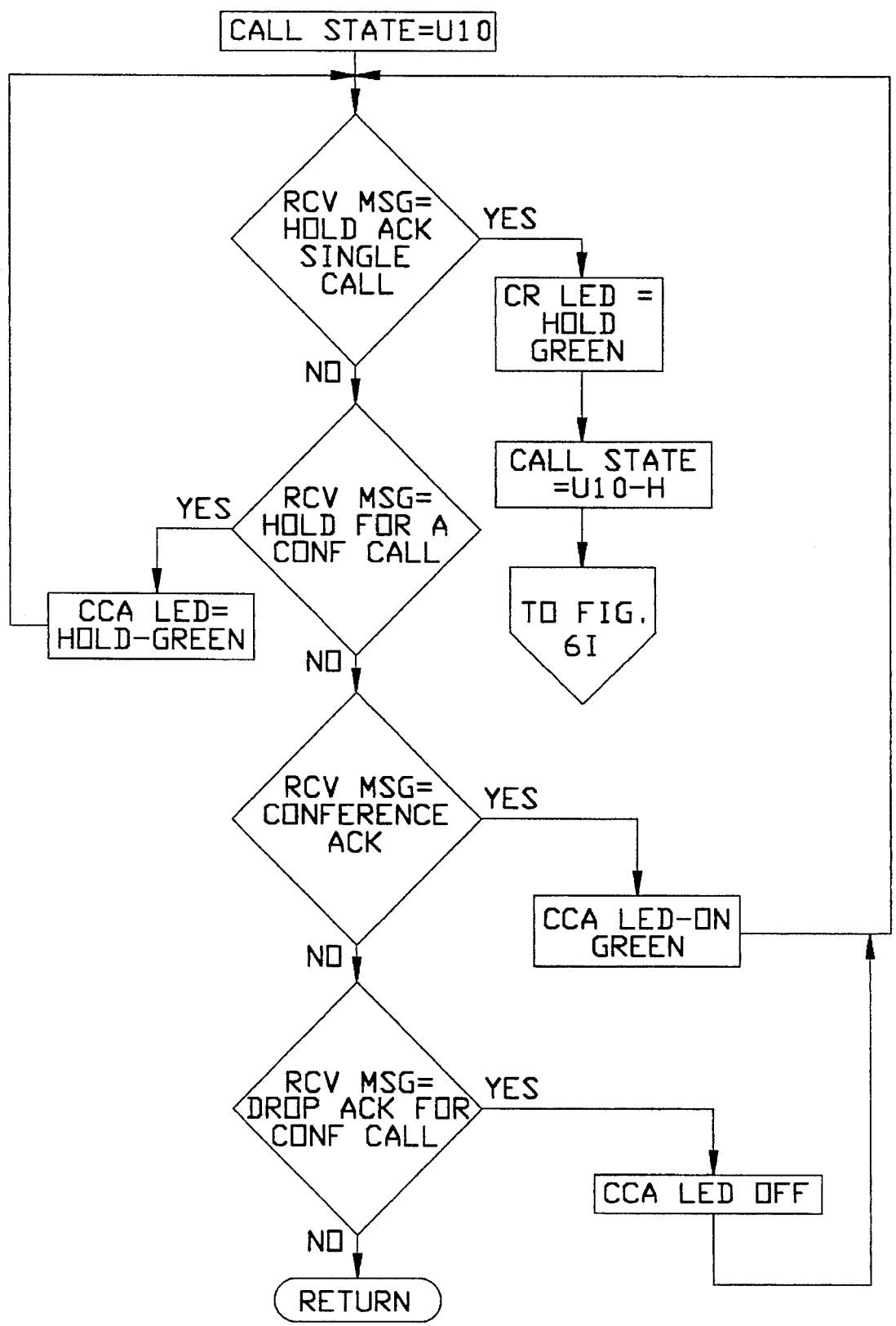

FIG. 6A shows how a call, when being in the call states shown in the figure proceeds to call state UO, FIG. 6H, null call state, as a result of the ACD 20, FIG. 1, sending a layer 3 message named "release". A call is disconnected from the ISDN telephonic unit 30 and to the LED's 93, FIG. 4, which indicate call presence are extinguished. If messages not of the type shown occur in the call state, the processing of the message occurs later in the program execution.

FIG. 6B shows how a call, when being in the call states shown in the figure, proceeds to call state UO, FIG. 6H, null call state, as a result of the ACD 20, FIG. 1, sending a layer 3 message named "disconnect". A call begins the sequence of being disconnected form the ISDN telephonic unit 30. If messages not of the type shown occur in the call state, the processing of the message occurs later in the program execution.

FIG. 6C shows how a call, when being in the call state U0-Null, shown in the figure, proceeds to call state U1, FIG. 6D, U7, FIG. 6C, or U8, FIG. 6K, dependent on the type of layer 3 message received from the ACD 20, FIG. 1. If the message is layer 3 message named "info (sca)" which arrives from the ACD 20, the ISDN unit 30 is making an outgoing call. The other messages shown, "setup (dca=sca)" and "setup (dca only)", indicate a call incoming to the ISDN unit 30 and the call in the unit begins the appropriate call sequence. The message "connect" immediately advances the sequence to state U10—the active call state. Conversation can immediately begin between a caller and the operator of the ISDN telephonic unit 30. If messages not of the type shown occur in the call state, the processing of the message occurs later in the program execution.

FIG. 6D shows how a call, when being in the call state U1—Outgoing call initiated, shown in the figure, proceeds to call state U2, FIG. 6E, U3, FIG. 6G, U4, FIG. 6F, or U10, FIG. 6H, dependent on the type of layer 3 message received from the ACD 20, FIG. 1. If the message is layer 3 message named "setup ack" arrives from the ACD 20, the ISDN based unit 30 enters into the overlap sending state U2 where multiple commands, not necessarily related to the outgoing call, from the ACD 20 are to be sent. The other messages shown, "call proceeding" advances the telephonic unit 30 into state U3, the call proceeding state. A message of the type "alerting" progresses the sequence to the call state U4—call ringing, indicate that all call information is delivered to the telephonic unit 30 regarding the call. If messages not of the type shown occur in the call state, the processing of the message occurs later in the program execution.

FIG. 6E shows how a call, when being in the call state U2—overlap sending shown in the figure, proceeds to call state U3, FIG. 6G or U10, FIG. 6H, dependent on the type of layer 3 message received from the ACD 20. If the message is layer 3 message named "conference acknowledge" arriving form the ACD 20, the ISDN unit 30 enters into the U10, the active call state, and a conference (multiple party) call is connected to the unit 30. If the message "call proceeding" is delivered to the unit 30, the call advances in call sequence to state U3, the call proceeding state. If messages not of the type shown occur in the call state, the processing of the message occurs later in the program execution.

FIG. 6F shows how a call, when being in the call state U4—call ringing, shown in the figure, proceeds to call state U10, FIG. 6H, dependent on the type of layer 3 message received from the ACD 20, FIG. 1. If the message is layer 3 message named "conference acknowledge" arrives from the ACD 20, the ISDN telephonic unit 30 enters into state U10, the active call state and a conference (multiple party) call is connected to the unit 30. If the message "connect" is delivered to the unit 30, a nonconference call occurs in the unit and the call advances in call sequence to state U10, the active call state. If messages not of the type shown occur in the call state, the processing of the message occurs later in the program execution.

FIG. 6G shows how a call, when being in the call state U3—call proceeding, shown in the figure, proceeds to call state U4, FIG. 6F, or U10, FIG. 6H, dependent on the type of layer 3 message named "conference acknowledge" arriving from the ACD 20, the ISDN unit 30 enters into state U10, the active call state, and a conference (multiple party) call is connected to the unit. If the message "connect" is delivered to the unit 30, a nonconference call occurs in the unit 30 and the call advances in call sequence to the state U10, the active call state. If messages not of the type shown occur in the call state, the processing of the message occurs later in the program execution.

FIG. 6H shows how a call, when having advanced to call state U10—active call, shown in the figure, proceeds to stay a call state U10 upon the receipt of various messages shown, except for the case where the ACD 20, FIG. 1, places a call on hold by sending the message "hold ack" to the ISDN telephonic unit 30, in which case the call proceeds to call state U10-H, a held active call, FIG. 6I. If the message is layer 3 message named "hold acknowledge (cca,oca)" arrives from the ACD 20, the unit 30 stays in state U10 and the conference call party represented by the oca and cca values (ocr=other call reference) currently active in the unit s put into a hold state. If the message "conference acknowledge(cca)" is delivered to the unit 30, the required steps necessary for creating a conference call in the unit occur and the call stays in state U10, the active call state. Upon receipt of the "drop(cca)" message in state U10, active call. If messages not of the type shown occur in the call state, the processing of the message occurs later in the program execution.

FIG. 6I shows how a call, when having advanced to call state U10H—active call held state, shown in the figure, proceeds in sequence to call state U10, FIG. 6H, upon receipt of the message "reconnect acknowledge" from the ACD 20, FIG. 1. If messages not of the type shown occur in the call state, the processing of the message occurs later in the program execution.

FIG. 6J shows the call sequence, when in call state U-19, release request, puts the call into state U0, FIG. 6C, the null call state, upon receipt of the message "release complete" from the ACD 10, FIG. 1, so to remove the indicated call from the ISDN telephonic unit 30. If messages not of the type shown occur in the call state, the processing of the message occurs later in the program execution.

FIG. 6K shows the call sequence, when in call state U8, connect request, puts the call into state U10, FIG. 6H, active call state, upon receipt of the message "connect acknowledge" from the ACD 20, FIG. 1. If messages not of the type shown occur in the call state, the processing of the message occurs later in the program execution.

FIG. 6L shows the call sequence, when in any call state, except for U10 active call, a message from the ACD 20, FIG. 1, of type "conference acknowledge" puts the call into state U10, FIG. 6H, active call state, as an active conference type call. If messages not of the type shown occur in the call state, the processing of the message occurs later in the program execution.

FIG. 7 depicts the program which is entered by the microprocessor 50, FIG. 2, every 10 milliseconds in step 22 as determined by an internal interrupt (not shown) of the microprocessor. In step 222 the interrupts are disabled. The interrupt routine of FIG. 7 performs tasks which require the need for timed intervals. The timed intervals range in duration between 10 milliseconds and 65.36 seconds in duration. Among these tasks is the determination whether new events have occurred because of a timer expiration in step 223. This task creates new tasks for timed execution by subsequently activating the work flag location for the associated task.

In step 224, FIG. 7, another task requiring timed intervals scans the keyboard 62, FIG. 2, for new events. To perform this task, the microprocessor 50 accesses the status of the keys 90 by inputting the key closure status. The microprocessor 50 maintains a previous record of the key status of the keys in RAM memory 54. By comparing this record with the current status acquired during the scanning task, the microprocessor 50 determines if a change in status has occurred. The changes are converted to tasks inserted in work queues and stored for later use by the main processing routine 200, FIG. 5A, determining the proper steps necessary for processing keypad 62, FIG. 2, input. In step 224, FIG. 7, the audio tones generated by the ISDN transceiver 64, FIG. 2, are controlled through the microprocessor 50. The microprocessor 50 controls tone activity generated by the ISDN transceiver 64 by sending the transceiver command on the frequency of tone, activity of tone, and the volume of the tone based upon various keyboard 62 and call message events.

Another task in step 225, FIG. 7, determining the timed intervals for updating the LCD Display 56, FIG. 2, of the unit 30 is required. To perform this task, the microprocessor 50 retrieves the display characters indicated by work queue entry. There are three different display buffers: remote mode, local mode, and the ISDN protocol message monitor mode. These characters are written to the eighty character LCD display 56, FIG. 4, in a cyclic manner. When the eightieth character is written to the display 56, a character counter is set to one and the routine writes the first five characters of the chosen RAM 54 display queue to the LCD display 56.

In step 226, FIG. 7, a task requires timed intervals for updating the status of LEDs 93, FIG. 4, on the ISDN telephonic unit 30 on the keyboard 62. The microprocessor 50 checks the work queue for an active flag to determine if any of the LEDs 93, FIG. 4, need to change illumination state. When required to perform this task, the microprocessor 50 sets the direction of current flow through the keyboard 62 LEDs 93 to control the color of the LED and sets timers for cyclic control of the frequency of flashing required by the microprocessor 50 for the LED 93, FIG. 4.

The task processed in step 227, FIG. 7, requires timed intervals for scanning the ISDN transceiver integrated circuit 64, FIG. 2, for the receipt of new messages from the ACD 20, FIG. 1, and the work queue for the transmission of messages to the ACD by the ISDN transceiver integrated circuit. The receipt of messages is done in conjunction with a capability of the ISDN transceiver 64, FIG. 2, to provide an indication accessible to the microprocessor 50 when a new message has been received from the ACD 20. If a new message is received, the microprocessor 50 prepares a new message event for the RAM 54 work queue with an active task flag for future processing by the microprocessor. Messages sent to the ACD 20, FIG. 1, from the work queue are transferred to the ISDN transceiver 64, FIG. 2, by the microprocessor 50 imputing the address in RAM 54 from the work queue indicating where the message is located in RAM and moving the message from RAM into the ISDN transceiver 64. The known technique of overlapping the sending of ISDN messages is selectively employable to expedite the processing of the call sequence messages. Interrupts are reactivated in step 228, FIG. 7, and a return to the next memory location for execution prior to the interrupt occurs in step 229.

Now referring to FIG. 8, the general outline of the elements in an ISDN task are shown. Step 206 of FIG. 5B, initialized the ISDN transceiver 64 and is related to the entry point in the execution of the ISDN task in step 230. A section of program is used in step 231 to control voice and Q.931 data connections between the ISDN telephonic unit 30, FIG. 1, and the ACD 20 as prescribed by the international standard for ISDN. Voice and signalling data information are sent concurrently between the ACD 20 and the telephonic unit 30 through an ISDN transceiver 64, FIG. 2, located in the circuit and an ISDN transceiver, not shown, located in the ACD 20. The management of the RAM 54, FIG. 2, message queues which temporarily contain messages for processing is also a function of the microprocessor 50. Included to fulfill the known requirements is a program for the control of the errorless reception of data from the ISDN line 38 used between the ACD 20 and the unit 30 in step 232, FIG. 8. Step 233 controls from the microprocessor 50, FIG. 2, any communications of information between the ISDN transceiver integrated circuit 64 and the microprocessor. Control of the allocation of the two B channels on the ISDN line 38 is performed in step 234, FIG. 8. As there are two B channels on an ISDN line 38, FIG. 2, the choice of the channel needed to be connected to the earpiece (not shown) of an audio communication is determined from a message sent by the ACD 20 to the ISDN telephonic unit 30, in step 234, FIG. 8. The parameters from the B channels needing initialization by the microprocessor 50, FIG. 2, and are fulfilled by this routine. Messages between the telephonic unit 30 and the ACD 20, FIG. 1, communicate over the ISDN D channel and the software steps paralleling international ISDN standards, are provided in step 235 to send the messages over the D channel. Upon task completion, the program returns in step 236 to the point in program memory 52, FIG. 2, where it was called from in step 230, FIG. 8.

Now referring to FIG. 9, in particular, the ISDN a telephonic unit 30 continues software execution from the Null State in step 300. The ISDN telephonic unit 30, FIG. 1, is in the Null state when it is not actively processing messages from the automatic call distributor 20. In step 302, FIG. 9, the microprocessor 50, FIG. 2, checks the incoming message queue to see if any messages have been sent by the ACD, 20, FIG. 1. If no layer 3 messages have been received by the ISDN unit 30, program execution returns to the Null state in step 300, FIG. 9.

If a layer 3 message has been received, program execution continues on to step 304, and the microprocessor 50, FIG. 2, determines if the message indicates the presence of incoming call to the ISDN telephonic unit 30, FIG. 1, from the ACD 20. If a message other than an incoming call message is received, program flow diverts to step 306 to handle the received message. The receipt of the standard CCITT incoming message of the type "setup", informs the telephonic unit 30 that a call is ready to be answered from the automatic call distributor 20.

Also included in the "setup" message are further instructions to the telephonic unit 30 on how to handle the incoming call. The term DCA=SCA stands for destination call appearance being the same as the selected call appearance values. Since the ISDN telephonic unit 30, FIG. 4, is representative of a multiple telephone line instrument with the line keys 92, FIG. 4, for Line 1, Line 2, and Line 3, and other keys 90 which can receive a call, a standard means is implemented which indicates the telephonic line key 92 for activation with the incoming call. The phone line which is activated for an incoming call is represented by the destination call appearance (DCA) message. The selected call appearance (SCA) value represents a number corresponding to a key by which the call is presented to in the ISDN telephonic unit 30, FIG. 1, and in the automatic call distributor 20 software, since multiple calls are active at any given time. Therefore, if no other calls are active in the telephonic unit 30, as tested in step 308, FIG. 9, and DCA=SCA in step 304, the incoming call goes through the process of being connected to the ISDN telephonic unit. If calls are active in the telephonic unit 30, execution branches on down to step 310, FIG. 9.

Under the conditions of DCA=SCA, special software has been incorporated into the apparatus so that the process of proceeding through multiple steps is avoided in order to quickly connect the call the operator as previously stated. Moreover, the ISDN telephonic unit 30, FIG. 1, does not audibly ring in this process eliminating the problems of distracting noises when many are present. The apparatus then sends a layer 3 "connect" message which indicates to the automatic call distributor 20 that the ISDN unit 30 is ready to receive the incoming call in step 312, FIG. 9. The program execution continues at step 314 by the telephonic unit 30, FIG. 4, illuminating a light emitting diode (LED) 93 located inside a line key 92 as specified by the DCA value to visually signal to an operator the line key 92, FIG. 4, the call is arriving. At this point, the program in the telephonic unit 30 is ready to take the call once the connection message sent by the unit 30 is acknowledged by the automatic call distributor 30, FIG. 1, in step 332, FIG. 9.

Referring to step 310, FIG. 9, the incoming messages from the ACD 20, FIG. 1, are handled in a similar manner as specified in the CCITT standards. The telephonic unit 30 determines whether a layer 3 message for activating a the ringer or speaker 78, FIG. 2, to announce that a call is present in step 310, FIG. 9, has been sent by the ACD 20. If the message is present, the telephonic unit 30 activates the audible speaker 78 in the unit, in step 316, FIG. 9. The processing continues at step 318 and the ISDN telephonic unit 30, FIG. 1, sends a layer 3 message named "altering" to the ACD 20 indicating it is in the process of alerting the operator at the unit of the incoming call.

In step 320, FIG. 9, the microprocessor 30, FIG. 2, illuminates the LED 93, FIG. 4, located inside the line key 92 associated with the DCA value as received from the ACD 20, FIG. 1, in step 304, FIG. 9, to red. The microprocessor 50, FIG. 2, flashes the LED 93 at a periodic rate. The ACD 20, FIG. 1, sends a layer 3 message which provides a new selected call appearance value for the call in step 322, FIG. 9, since the telephonic unit 30, FIG. 1, already has active calls present.

The ISDN telephonic unit 30 waits for an operator to actuate the line key 92, FIG. 4, on the unit to answer the call in step 324, FIG. 9. The program stays at step 324 until either the call is answered by the agent or operator through actuation of the appropriate line key 92, FIG. 4, or the call is discontinued by the automatic call distributor 20, FIG. 1. In response to the operator actuating the flashing line key 92, FIG. 4, in step 324, FIG. 9, the telephonic unit 30, FIG. 1, signals to the ACD 20 sending a layer 3 message named "connect" indicating that the call is answered by the ISDN telephonic unit 30.

Since an operator has actuated a line key 92, FIG. 4, indicating the desire to answer the call, the ACD 20 sends a layer 3 message indicating the telephonic unit 30 to deactivate the ringer or speaker 78, FIG. 2, and is tested for in step 328, FIG. 9. If the ringer 78, FIG. 2, was activated by the ACD 20, FIG. 1, in step 310, FIG. 9, the ACD will deactivate the ringer by sending a layer 3 message named "ringer off", which turns off the ringer in step 330 Call processing then proceeds on to step 332.

In step 332, the ISDN unit 30 waits for a confirmation message from the ACD 20, FIG. 1, to signal that it is appropriate to electrically connect the audio path of the operator at the unit 30 to the ACD. In response to the message being received by the ISDN unit 30, processing continues to step 334, FIG. 9, where the ISDN telephonic unit 30, FIG. 1, illuminates the LED 93, FIG. 4, located in the line key 92 now to a green color to signal that the call is answered and is currently active as seen in step 336 of FIG. 9.

Figure 10A:
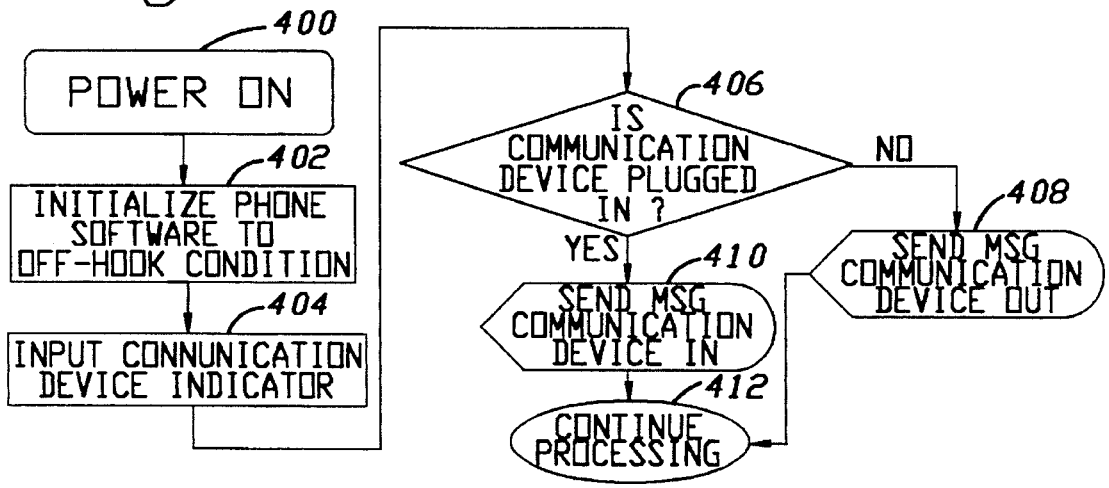
FIGS. 10A and 10B are flow charts for the particular sections of the preferred computer programs stored in the EPROM of the ISDN based telephonic unit of FIG. 2 for detection of a connection of a communication device to the ISDN telephonic unit.

Now referring to FIG. 10A, in particular, the ISDN telephonic unit 30, FIG. 1, begins the execution in step 400 when the power is applied to the circuitry. During the initialization period, the hookswitch routine initializes the telephonic unit software in the EPROM 52, FIG. 2, to the off-hook condition in step 402. Any software routines based upon the industry standard design set a program RAM 54 memory location in the software to indicate an on-hook condition. In step 404, FIG. 10A, the microprocessor 50 inputs the state of the communication device 82, indicator 119 of FIG. 3. Communication devices 82 in the preferred embodiment are audio handsets and headsets; however, microphones, speakers, audio tape recorders and other audio communication devices are employable for use in the ISDN unit 30. This value is then tested to determine whether an audio communication device is plugged into the ISDN telephonic unit 30. The value is also stored at a location in the RAM 54, FIG. 2, memory for future processing purposes. If the communication device 82 is plugged in, the unit 30 proceeds to send a layer 3 message to the ACD 20, FIG. 1, indicating the communication device is plugged in at step 410, FIG. 10A. However, if negative, the telephonic unit 30 sends a layer 3 Management Information Message (MIM) to the ACD 20, FIG. 1, indicating the audio communicator device is not connected to the unit. A Management Information Message (MIM) is used by the ACD 20 to set and retrieve ISDN telephonic unit 30 parameters and cause actions to be performed by the unit. At step 412, FIG. 10A, microprocessor 50, FIG. 2, continues to process the software tasks stored in the EPROM 52.

The ACD 20, FIG. 1, upon receiving this initialization message determines the action to take. If the message from the telephonic unit 30 is that an audio communication device 2 connects to the unit, the ACD 20 sends calls to the unit. A message that the communication device 82, FIG. 2, is not connected, causes the ACD 20, FIG. 1, to send a message such as "Please plug-in" to the telephonic unit 30, FIG. 2, LCD display 56 indicating to the operator that the audio device 82 is not connected to the unit. The ACD 20, FIG. 1, prohibits calls from being sent to the ISDN telephonic unit 30 under this circumstance since no operator is electrically connected to the unit 30. Otherwise, callers would be connected to ISDN telephonic units without an operator present. Moreover, the ACD 20, FIG. 1, does not allow a user to continue operations until a communication device 82 is plugged into the telephonic unit 30. The next input of a communication device 82 to the telephonic unit 30 is sensed by a timed polling software routine described below in FIG. 10B.

The software then proceeds in a time driven manner. Every 10 milliseconds, a timer expires which causes an interrupt to occur in step 420, FIG. 10B. The interrupt is the processed by the following software steps. The microprocessor 50, FIG. 2, inputs the state of the audio communication device 82 indicator 119 in step 422, FIG. 10B. This value is tested to determine whether a communication device, FIG. 2, is plugged into the ISDN telephonic unit 30, in step 424. If affirmative, the microprocessor 50, FIG. 2, proceeds to test the communication device 82 flag memory location in step 426 to determine if formerly the communication device flag was true, indicating that ten milliseconds earlier, the device 82 was connected with the telephonic unit 30. If true, the ISDN telephonic unit 30 continues normal processing in step 438 by returning to the software location prior to the interrupt occurring.

Figure 10B:
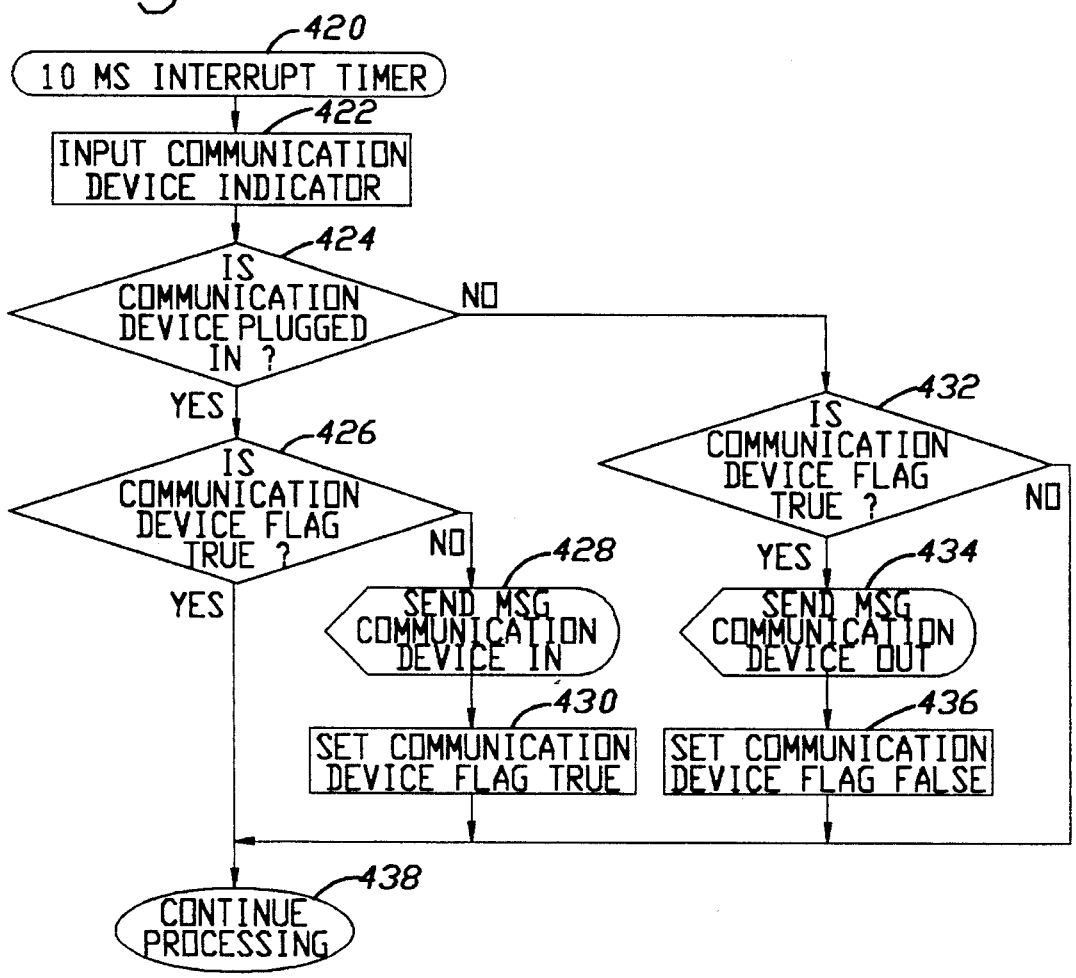

If in step 426 the communication device flag is not true there, this indicates that the device 82 had been plugged into the telephonic unit 30 and the unit continues by sending a layer 3 Management Information Message (MIM) to the ACD 20, FIG. 1, in step 428, FIG. 10B, which contains the message that the communication device 82 is plugged into the unit. The microprocessor 50, FIG. 2, stores the new value for the communication device flag as true in the device flag memory location in step 430. Processing continues back to step 438 in FIG. 10B.

If the test of the communication device 82, FIG. 2, being plugged fails in step 424, FIG. 10B, processing occurs in step 32 to determine if formerly the communication device flag was true, indicating that during the past 10 milliseconds that the communication device 82, FIG. 2, was disconnected from the ISDN telephonic unit 30. If the flag was formerly true, the microprocessor 50, FIG. 2, then sends a layer 3 message to the automatic call distributor 20, FIG. 1, that the communication device is not connected to the telephonic unit 30 in step 434. If false, program branches to step 438, FIG. 10B. The microprocessor 50 stores the value of the false communication device flag in step 436 in the communication device 82, FIG. 2, flag RAM 54 memory location. Processing continues to step 438, FIG. 10B.

The automatic call distributor 20, FIG. 1, determines what actions to take after receiving a communication device message from the ISDN telephonic unit 30. The operator must reconnect the communication device 82 to the telephonic unit 30 in order for the operator to continue to use the functions of the unit. The ACD 20, FIG. 1, sends a layer 3 message to the ISDN unit 30 so that the phone shows "Please plug-in" on the LCD display 56, FIG. 4, of the unit to indicate this requirement to the operator.

Figure 11A:
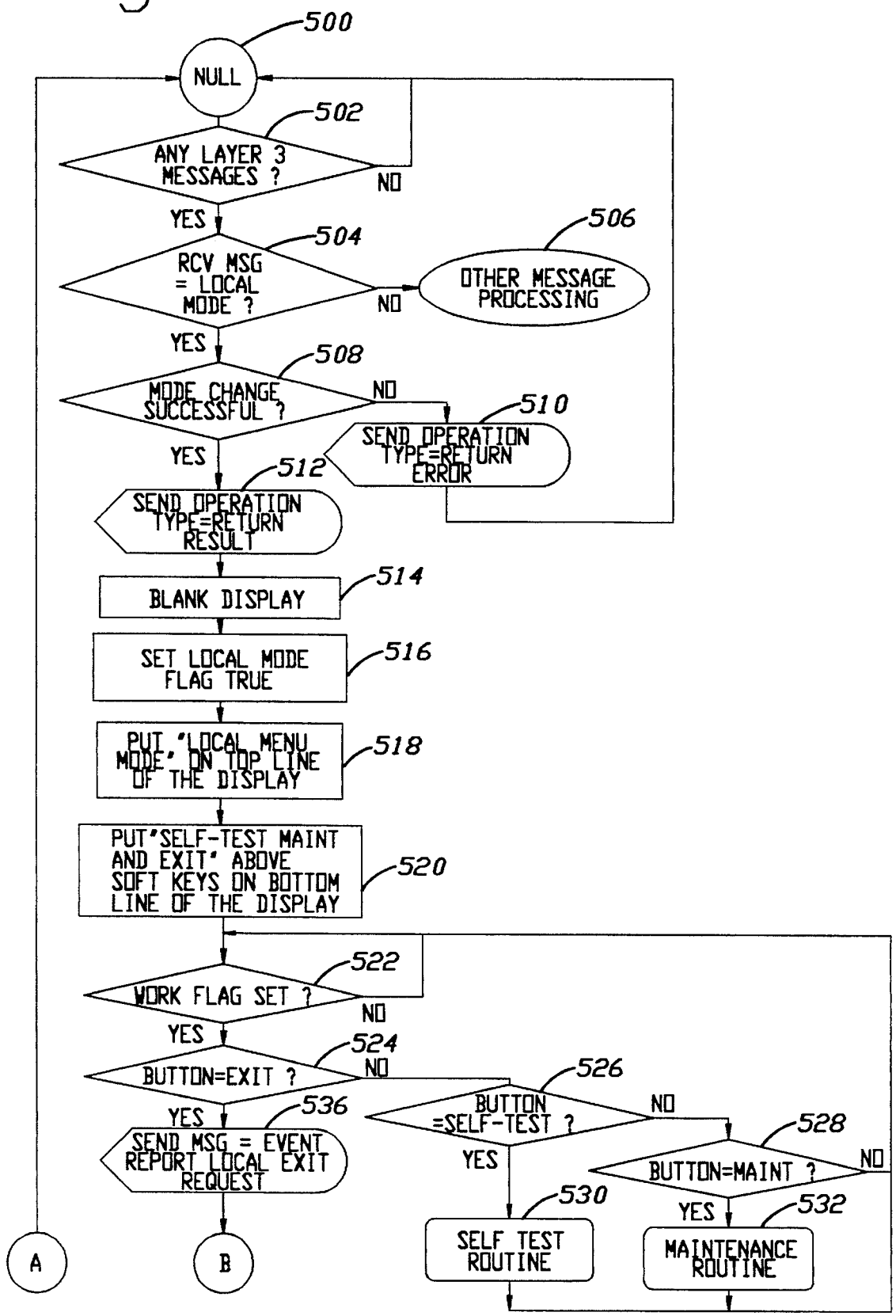
FIGS. 11A and 11B are flow charts for the particular section of the preferred computer programs stored in the EPROM of the ISDN based telephonic unit of FIG. 2 for controlling the access to the customized parameters mode of the ISDN telephonic unit.

Now referring to FIG. 11A, in particular, the ISDN telephonic unit 30 continues execution from the Null State 500. While the telephonic unit 30, FIG. 1, is in the Null state, it is not actively processing messages from the automatic call distributor 20. In step 502, FIG. 11A, the microprocessor 50, FIG. 2, checks the incoming message queue to see if any messages have been sent by the ACD 20. If no layer 3 messages have been received by the telephonic circuit 30, program execution returns to the null state 500, FIG. 11A.

However, if a layer 3 message has been received, program execution continues on to step 504, where the microprocessor 50, FIG. 2, determines if the message from the ACD 20, FIG. 1, indicates that the ISDN telephonic unit 30 has been instructed to go into the local mode of operation. When another type of message is received, program flow diverts to step 506, FIG. 11A, to handle the received message. The receipt of the standard CCITT Management Information Message (MIM) of the type defined between the telephonic unit 30, FIG. 1, and the ACD 20 is received, the unit attempts to enter into the local mode of operation.

The success in changing to the local mode is then tested in step 508, FIG. 11A. If the transition has been unsuccessful, the ISDN telephonic unit 30 sends a layer 3 MIM message to the ACD 20 of the type "operation type=return error" in step 510, FIG. 11A, and processing defaults back to the null state 500. A successful transition initiates the telephonic unit 30, FIG. 1, to send a layer 3 MIM message to the ACD 20 of the type "operation type=return result" in step 512, FIG. 11A. In step 514 the telephonic unit 30, FIG. 1, controls the display and the functions of the unit. The unit 30 places blank characters into the liquid crystal display (LCD) 56, FIG. 4, to clear the information in the display.

Internal locations which represents the state of the ISDN telephonic unit 30, FIG. 2, either local or remote, in the microprocessor 50 RAM 54 are set to indicate in step 516, FIG. 11A, that the telephonic unit is in the local mode of operation. The ASCII characters "LOCAL MENU MODE" are written by the microprocessor 50, FIG. 2, to the top line of the LCD in step 518, FIG. 11A, to provide an indication to the operator that the telephonic unit is in a local mode of operation.

In step 520, the microprocessor 50, FIG. 2, writes the character "Self-Test, Maint., Exit" into the second line of the LCD 56. These are the operations which are performed in the local menu. These words on the display 56, FIG. 4, are located above soft keys 94 which are a part of the telephonic unit 30 keypad 62. The use of a programmable display along with a keypad 62 is commonly referred to as soft keys 94. The soft keys 94 do not have a fixed or hard function assigned to them as the display 56 can be changed. The program then checks to see if a memory location has been set to indicate activation of a key on the keyboard 62 in step 522, FIG. 11A, by the operator. As seen in FIG. 11C, a separate routine exists for the collection of key closures on the keypad 62. The end result is that the work flag becomes active whenever a key 90 is actuated on the ISDN telephonic unit 30. If the memory location has not been set, thereby indicating that a key has not been actuated, the program continues to loop at step 522 until such an event occurs. If a key is actuated, execution in step 524 then checks if the actuated button was the exit soft key 94, FIG. 4. If the user actuates this button, a return to the remote mode of operation is made and telephone calls are answered. If negative, the program continues to isolate and determine which button was actuated.

If it is determined in step 526, FIG. 11A, that the soft key 94 labeled in the display as Self-test is actuated, the telephonic unit 30, FIG. 2, software executes a software routine 530 to check the functionality of the major systems components, such as memory, the display 56, etc., in the unit 30. Upon completion, an indication of the test results are displayed on the LCD 56 and program flow returns to step 522, FIG. 11A.

If the soft key 94, FIG. 4, under the word "Maint" written in the display 56, is actuated in step 528, the ISDN unit 30 executes a maintenance routine in step 532, and then returns to step 522 to check for further actuation of the keys on the keyboard 56, FIG. 4. The maintenance routine provides access to the software version inside the telephonic unit at the EPROM 52, FIG. 2, unit identification number, and other elements common to ISDN telephonic unit implementations.

If it is determined that the exit soft key 94 is closed in step 524, the ISDN telephonic unit 30 sends a MIM layer 3 message of "local exit request" to the ACD 20, FIG. 1 to indicate the user wishes to leave the local mode and return to the remote mode in step 536, FIG. 11A. The ISDN telephonic unit 30 waits to receive a message from the ACD 20, FIG. 1, commanding it to enter the remote mode in step 538, FIG. 11B. Once the message is received, the telephonic unit 30, FIG. 1, determines if it can satisfy the request to return to the remote mode. The unit 30 checks to see that it is currently in the local mode so that it can now go into the remote mode in step 540, FIG. 11B. If the change is successful, the RAM memory location 54, FIG. 2, for storing the state of remote mode of the unit is updated to true in step 544, FIG. 11B, and the unit 30 responds by sending a MIM layer 3 message of operation type=return result to indicate the success to the ACD Program execution of the routines is not completed and the ISDN telephonic unit returns to the null state as seen in step 500. The memory location indicating local operation is set to false.

Figure 11B:
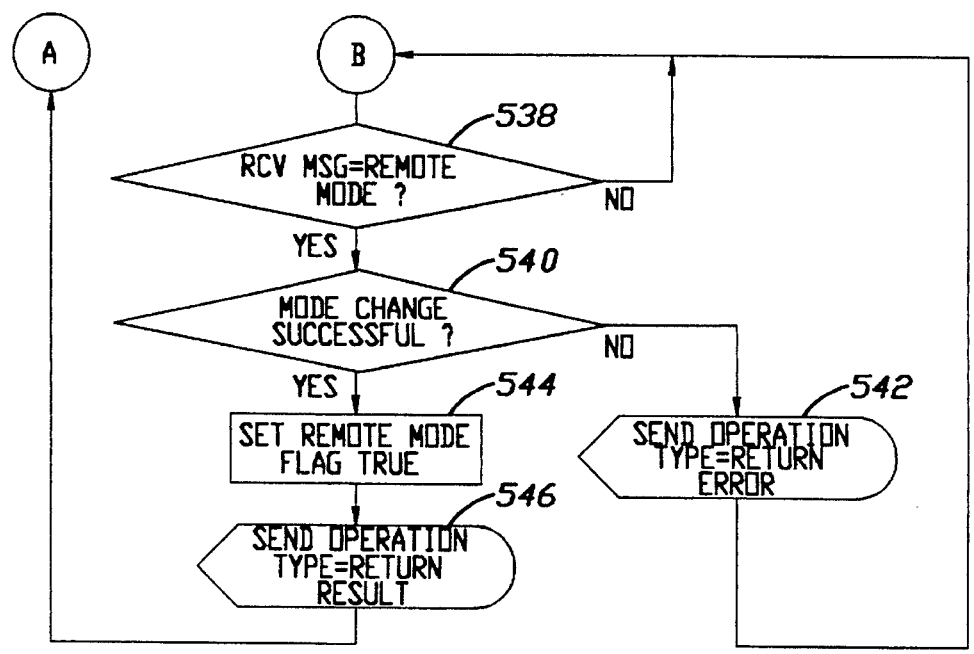
Figure 11C:
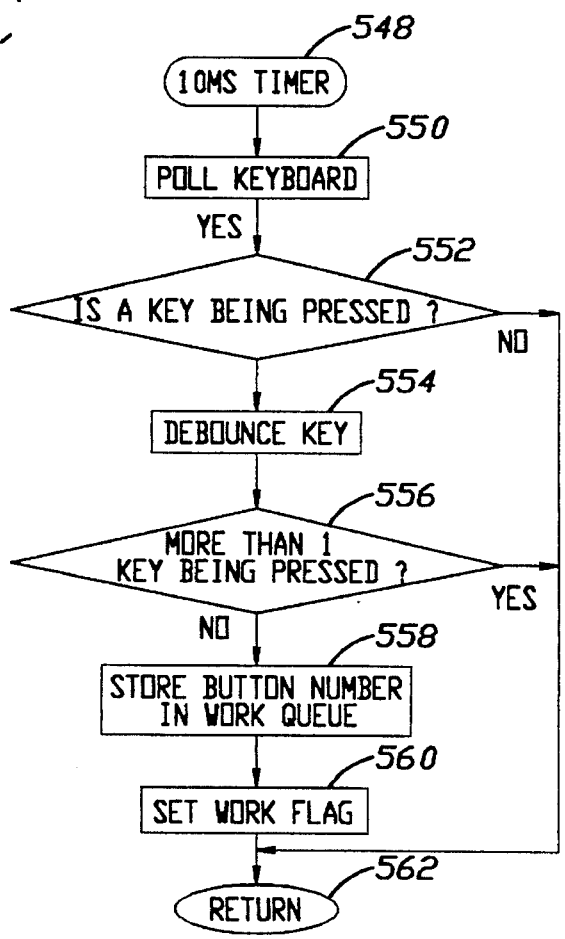
FIG. 11C is a flow chart for the preferred method of monitoring the keyboard of the ISDN telephonic unit of FIG. 2.

Otherwise, if the mode change has failed in step 540, the unit 30, FIG. 1, sends a MIM layer 3 message of operation type=return error to indicate the failure to the ACD 20 and branches back to step 538, FIG. 11B, to wait for another message from the ACD.

Now referring to FIG. 11C, a manner for monitoring and reporting to the microprocessor 50, FIG. 2, when its operation actuates a key on the keypad 62, FIG. 4, is explained. The operator selectively actuates keys to move between remote and local modes of operation upon commands from the ACD 20, FIG. 1, as seen in FIG. 11A. This routine executes every 10 millisecond due to a timer interrupting the microprocessor 50 in step 548, FIG. 11C.

At the start of the routine of FIG. 11C, the microprocessor 50, FIG. 2, polls the keyboard 62 in step 550 to determine if any key is being actuated. This routine ends and returns the processor 50, FIG. 2, to the program memory location at the EPROM 52 before the interrupt occurred if no key is being actuated by a user in step 562, FIG. 11C. If affirmative, the microprocessor 50, FIG. 2, performs a debounce operation in step 554, FIG. 11C, on the key closure. A debounce routine is commonly known and is used for the detection of mechanical keys closures. An electrically conducting element of the key makes contact between two metal plates to indicate closure and bounces off of the metal plates multiple times until finally settling upon the plates. This bouncing action of the key lasts a few hundred milliseconds, and looks to the microprocessor as though the key has been actuated multiple times, before the key settles into position. The routine through periodic sampling, determines if a key closure exists and then determines that the key has only been actuated once.

If more than one key is being actuated in step 556, FIG. 11C, the program advances to step 562, as only a single key press is valid input for this telephonic unit 30, FIG. 2. If only one key is closed, though, a number representing the key actuated in step 558 is stored in a work queue for the microprocessor 50, FIG. 2. As is common in timer based systems, a section of program code is used to schedule the types of program activities for a microprocessor to execute and queues are used to hold the information needed by the scheduled program activities.

A memory location in the EPROM 52, named work flag, is set in step 560 to indicate that there is a queue element requiring further processing. In this case, a key actuation has occurred. The section of program then continues to step 562 where a return from the timer interrupt occurs, and program execution continues.

Figure 12:
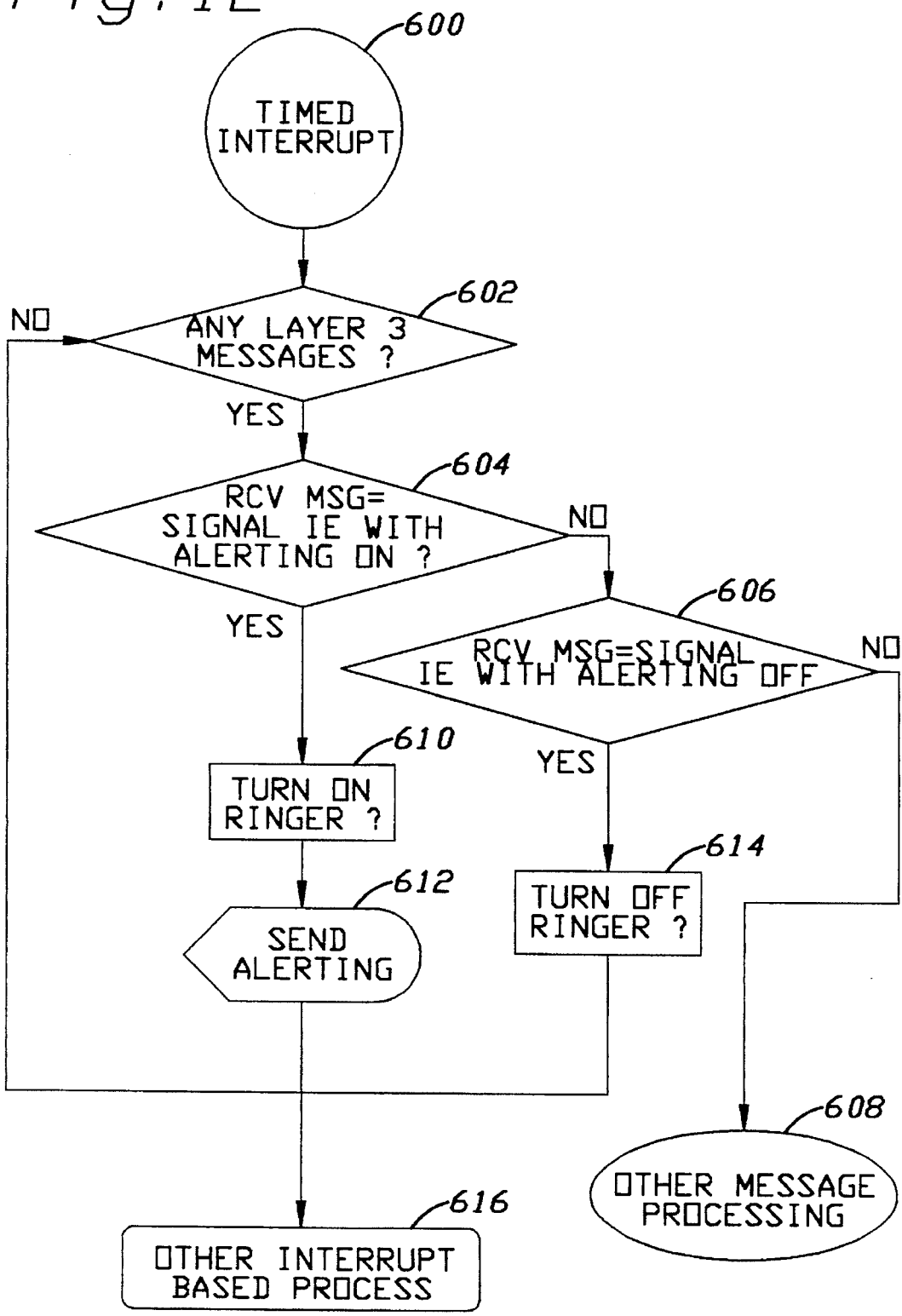
FIG. 12 is a flow chart for the particular section of the preferred computer programs stored in the EPROM of the ISDN based telephonic unit of FIG. 2 for controlling the ringer of the ISDN telephonic unit.

Now referring to FIG. 12, in particular, the ISDN telephonic unit 30 executes from a timed interrupt source which is activated in step 600. In step 602 the microprocessor 50, FIG. 2, checks the incoming message queue to see if any messages have been sent by the automatic call distributor 20, FIG. 1. If no layer 3 messages are received by the telephonic unit 30, program execution continues executing any other interrupt based tasks in step 616, FIG. 12.

If a layer 3 message is received, program execution continues on to step 604 in which the microprocessor 50, FIG. 2, determines if the message from the ACD 20, FIG. 1, indicates that the telephonic unit 30 is instructed activate the audible ringer or speaker 78, FIG. 2. If affirmative, in step 610, FIG. 12, the microprocessor 50, FIG. 2, activates the ringing pattern chosen in the message by instructing the AMD79C30 integrated circuit 64 to begin playing audio tones through the speaker 78. The microprocessor 50 sends an alerting type of message in step 612, FIG. 12, to tell the ACD 20, FIG. 1, that the ringer 78, FIG. 2 is activated. Program flow then continues on to other interrupt based processes at step 616, FIG. 12.

If the layer 3 message does not indicate that the unit 30 is instructed to activate the ringer in step 604 of FIG. 12, then the microprocessor 50, FIG. 2, determines if the message from the ACD 20, FIG. 1, indicates that the unit 30 has been instructed deactivate the audible ringer 78, FIG. 2, in step 606. If the test indicates true, the microprocessor 50, FIG. 2, signals to the AMD79C30 transceiver 64 to turn off the audible ringing occurring in the speaker 78, FIG. 2, in step 614, FIG. 12. Program flow then continues on to other interrupt based processes in step 616. If another type of message is received at the ISDN telephonic unit 30, program flow diverts to step 608 to handle the received message.

Now referring to FIG. 13, in particular, the ISDN telephonic unit 30, FIG. 1, continues software execution from a timed interrupt source which frequently activates in step 700. In step 702 the microprocessor 50, FIG. 2, checks the incoming message queue to see if any messages have been sent by the automatic call distribution system 20, FIG. 1. If no layer 3 messages have ben received by the telephonic unit 30, program execution continues executing any other interrupt based tasks in step 716.

If a layer 3 message is received, program execution continues on to step 704, where the microprocessor 50, FIG. 2, determines if the message form the ACD 20, FIG. 1, indicates that the unit 30 has been instructed with a conference acknowledge message. If negative, the telephonic unit 30 goes on to step 706, FIG. 13, in the processing of other layer 3 messages. If affirmative, the microprocessor 50, FIG. 2, advances to step 708 where it checks if the call reference value (CRV) included in the conference acknowledges message equals a call reference value of a call currently active in the telephonic unit, for a conference call to be created with an active existing call. If negative, in step 710 the program code handles this type of conference call operation in the telephonic unit 30, FIG. 1. If affirmative, in step 712, FIG. 13, the microprocessor 50, FIG. 2, adds a new call appearance to be associated with the call reference value to the memory table in the telephonic unit 30 which contains a list of all parties on the call.

In step 714, FIG. 13, the microprocessor 50, FIG. 2, illuminates the LED 93, FIG. 4, in the telephonic unit key which contains the conference call directed by the conference call appearance (cca) value contained in the conference acknowledge message of step 708. The program advances on to step 716 where other interrupt based processes execute. A conference call is active in the telephonic unit 30 and the operator has not actuated any telephonic unit keys to accomplish it.

While a detailed description of the preferred embodiment of the invention has been given, it should be appreciated that many variations can be made thereto without departing from the scope of the invention as set forth in the appended claims.

We claim:

1. In an automatic call distribution system with an automatic call distributor for selectively interconnecting calls made from external telephonic units through an external telephonic network connected with the system, the improvement comprising:

a plurality of ISDN interior telephonic units with standard ISDN characteristics provided by a standard ISDN messaging protocol in which the ISDN interior telephonic units are connected with the automatic call distributor for receipt of incoming calls from the external telephonic units;

means within the ISDN interior telephonic units for selectively altering the standard ISDN message protocols of the ISDN interior telephonic units to provide the ISDN interior telephonic units with nonstandard ISDN performance characteristics usable in a call distribution environment.

2. The automatic call distribution system of claim 1 in which said selectively altering means includes a programmed microprocessor within the ISDN interior telephonic units which is programmed to alter some of said standard ISDN characteristics.

3. The automatic call distribution system of claim 1 in which said selectively altering means includes a microprocessor at said automatic call distributor programmed to interface with the ISDN interior telephone units with respect to the nonstandard ISDN performance characteristics.

4. The automatic call distribution system of claim 1 in which said nonstandard ISDN performance characteristics include at least one of the characteristics functionally being capable of (a) avoiding an off-hook condition for the ISDN interior telephonic units to receive a call, (b) transmitting an indication of disconnection of a communication device from the ISDN interior telephonic units to preclude connection of calls from the automatic call distributor to the ISDN interior telephonic unit, (c) placing a party to a conference call on hold during the conference call in response to actuation of a single key on one of the plurality of ISDN interior telephonic units, (d) reconnect acknowledgement for a held party of a conference call indicating an establishment of a two way voice path between the held party and one of the plurality of ISDN interior telephonic units during the conference call, (e) indication of an addition of an additional party to a call in progress, (f) termination of a conference call in response to actuation of a single key on one of the plurality of ISDN interior telephonic units, and (g) selective control of a ringer at one of the plurality of ISDN interior telephonic units.

5. The automatic call distribution system of claim 4 in which the nonstandard ISDN performance characteristics include a plurality of characteristics (a)–(g).

6. The automatic call distribution system of claim 4 in which the nonstandard performance characteristics include all of the plurality of characteristics (a)–(g) recited in claim 4.

7. In an automatic call distribution system with an automatic call distribution for selectively interconnecting calls made from external telephonic units through an external telephonic network connected with the system, the method of making ISDN compatible call connections with the interior telephonic units, comprising the steps of:

providing each of the plurality of interior telephonic units with ISDN characteristics defined by standard ISDN message protocols; and selectively altering the standard ISDN message protocols of the ISDN interior telephonic units to provide the ISDN interior telephonic units with nonstandard ISDN performance characteristics usable in a call distribution environment.

8. The method of claim 7 in which said step of providing includes the steps of providing each of the interior telephonic units with hardware programmable to operate with standard ISDN characteristics, and programming the hardware to alter the standard ISDN characteristics of the hardware.

9. The method of claim 7 in which the nonstandard ISDN performance characteristics include the characteristic of functionally being capable of at least one of (a) avoiding an off-hook condition for the ISDN interior telephonic units to receive a call, (b) transmitting an indication of disconnection of a communication device from the ISDN interior telephonic units to preclude connection of calls from the automatic call distributor to the ISDN interior telephonic units, (c) placing a party to a conference call on hold during conference call upon actuation of a single key on one of the plurality of ISDN interior telephonic units, (d) reconnect acknowledgement for a held party to a conference call indicating a re-establishment of a two way voice path between the held party and one of the plurality of ISDN interior telephonic units during the conference call, (e) indication of an addition of an additional party to a call in progress, (f) termination of a conference call upon actuation of a single key on one of the plurality of ISDN interior telephonic units, and (g) selective control of a ringer at one of the plurality of ISDN interior telephonic units.

10. The method of claim 9 in which the nonstandard ISDN performance characteristics includes a plurality of characteristics (a)–(g) recited in claim 9.

11. The method of claim 9 in which the nonstandard ISDN performance characteristics includes all of a plurality of the characteristics of (a)–(g) recited in claim 9.

12. In an automatic call distribution system with a computer controlled multiport switch for selectively interconnecting a plurality of internal telephonic units of an internal telephonic network with external telephonic units of an external telephonic network, the improvement comprising:

means for providing the internal telephonic units with ISDN characteristics to make them ISDN telephonic units;

means for sending an altered ISDN message to the multiport switch indicating from the ISDN telephonic units that the ISDN telephonic units are in an available state to receive calls;

means associated with the ISDN telephonic units for automatically indicating to the computer controlled multiport switch that the ISDN telephonic units are in an idle state ready to receive incoming calls;

means for selective and automatic connecting of incoming calls through the multiport switch to those ISDN telephonic units that are providing indications they are in an idle and available state; and means for automatically accepting incoming calls connected to ISDN telephonic units in the idle and available state through the multiport switch by said selectively and automatically connecting means.

13. The automatic call distribution system of claim 12 in which said ISDN internal telephonic units have ringers;

means for causing a ringer at one of the ISDN internal telephonic units to ring when a call comes into the one of the ISDN internal telephonic units in the idle state, and means for disabling the ringer causing means to ring the ringer when a call comes in to the one of the ISDN internal telephonic units in the active state.

14. In an automated call distribution system with a computer controlled multiport switch for selectively interconnecting a plurality of internal ISDN telephonic units with a plurality of incoming calls from external telephonic units, the improvement comprising:

means for determining whether the internal ISDN telephonic units are in an active state in which they are not ready to receive a call immediately or in an idle state in which they are ready to receive a call immediately;

means responsive to the determining means for selectively interconnecting incoming calls to internal ISDN telephonic units determined to be in an idle state in accordance with an ISDN standard communications protocol; and means responsive to the determining means for selectively interconnecting incoming calls to active ones of the internal ISDN telephonic units in accordance with a nonstandard protocol which is different from the ISDN standard protocol.

15. The automatic call distribution system of claim 14 in which said ISDN standard communications protocol includes at least one of (a) generation of an off-hook signal from the ISDN telephonic units, and (b) ringer actuation by ringing voltage received from the multiport switch.

16. In an automated call distribution system with a computer controlled multiport switch for selectively interconnecting a plurality of internal ISDN telephonic units with a plurality of incoming calls from external telephonic units, a method of making ISDN compatible call connections with the internal telephonic units, comprising the steps of:

determining whether the internal ISDN telephonic units are in an active state in which they are not ready to receive a call immediately or in an idle state in which they are ready to receive a call immediately;

selectively interconnecting incoming calls to internal ISDN telephonic units determined to be in an idle state in accordance with an ISDN standard communication protocol; and selectively interconnecting incoming calls to the internal ISDN telephonic units determined to be in the active state in accordance with a nonstandard protocol which is different from the ISDN standard protocol.

17. The method of claim 16 in which said ISDN protocol requires at least one of (a) generation of an off-hook signal from the ISDN telephonic units, and (b) ringer actuation by ringing voltage received from the multiport switch.

18. In an automatic call distribution system with a computer controlled automatic call distributor for selectively interconnecting telephonic calls received from external telephonic units of an external telephonic network to interior telephonic units having hook switches, the improvement comprising:

means for providing the interior telephonic units with ISDN characteristics to make them interior ISDN telephonic units;

means for disconnecting telephonic calls at the interior ISDN telephonic units received from the external telephonic units;

means responsive to the disconnecting means for automatically indicating to the automatic call distributor that the interior ISDN telephonic units are in an off-hook state independent of actuation of hook switches of the interior ISDN telephonic units; and means responsive to actuating the indicating means for directly connecting calls from the external telephonic units to the interior ISDN telephonic units independent of actuation of hook switches.

19. In an automatic call distribution system with a call distributor for selectively interconnecting telephonic calls from external telephonic units of an external telephonic switching network with a plurality of internal telephonic units in which each of the internal telephonic units has a releasably connectable audio communication device, the improvement comprising:

means for providing the internal telephonic units with ISDN characteristics to make them ISDN telephonic units;

means at one of the ISDN telephonic units for detecting disconnection of an audio communication device from the one of the ISDN telephonic units;

means responsive to the detecting means for transmitting a message which indicates disconnection of a headset from the one of the ISDN telephonic units to the call distributor in accordance with a standard ISDN protocol; and means at the call distributor responsive to receipt of said message from the one of the ISDN telephonic units for preventing the interconnection of incoming telephonic calls to the one of the internal ISDN telephonic units at which the headset is disconnected.

20. In an automatic call distribution system with a call distributor for selectively interconnecting telephonic calls from external telephonic units of an external telephonic switching network with a plurality of internal telephonic units in which each of the internal telephonic units has a releasably connectable audio communication device, a method of making ISDN compatible call connections with the internal telephonic units, comprising the steps of:

providing the interior telephonic units with ISDN characteristics to make them ISDN telephonic units;

detecting disconnection of an audio communication device from one of the ISDN telephonic units;

transmitting a message which indicates disconnection of the audio communication device from one of the ISDN telephonic units to the call distributor in accordance with a standard ISDN protocol; and preventing the interconnection of incoming telephonic calls to the one of the ISDN telephonic units at which the audio communication device is disconnected.

21. In an automatic call distribution system having a computer controlled multiport switch for selectively interconnecting a plurality of internal telephonic units with a plurality of external telephonic units of an external telephonic switching network, the improvement comprising:

means for providing the internal telephonic units with ISDN characteristics;

means for creating a conference call between at least two external telephonic units and an ISDN internal telephonic unit; and means associated with the ISDN internal telephonic unit for placing one of the external telephonic units on hold with a single key actuation while maintaining the conference call between the ISDN internal telephonic unit and at least one other of the external telephonic units.

22. In an automatic call distribution system having a computer controlled multiport switch for selectively interconnecting a plurality of internal telephonic units with a plurality of external telephonic units of an external telephonic switching network, a method of making ISDN compatible call connections with the internal telephonic units, comprising the steps of:

providing the internal telephonic units with ISDN characteristics;

creating a conference call between at least two external telephonic units and an ISDN internal telephonic unit; and placing one of the external telephonic units on hold with a single key actuation while maintaining the conference call between the ISDN internal telephonic unit and at least one other of the external telephonic units.

23. In an automatic call distribution system having a multiport switch for selectively interconnecting a plurality of external telephonic units of an external switching network to a plurality of internal telephonic units of the call distribution system, the improvement comprising:

means for providing the internal telephonic units with ISDN characteristics to make them ISDN internal telephonic units;

means at the ISDN internal telephonic units for establishing a multiple party telephonic conference call;

means associated with the ISDN internal telephonic units for placing one of the parties to a telephonic conference call on hold; and means associated with the ISDN internal telephonic units for acknowledging to the multiport switch the ability to reconnect the party placed on hold to the multiple party conference call.

24. In an automatic call distributor system having a multiport switch for selectively interconnecting a plurality of external telephonic units of an external switching network to a plurality of internal telephonic units of the call distribution system, a method of making ISDN compatible call connections with the internal telephonic units, comprising the steps of:

providing the internal telephonic units with ISDN characteristics to make them ISDN internal telephonic units;

establishing a multiple party telephonic conference call;

placing one of the parties to the telephonic conference call on hold; and acknowledging to the multiport switch the ability to reconnect the party placed on hold to the multiple party conference call.

25. In an automatic call distribution system with a computer controlled multiport switch for selectively interconnecting a plurality of external telephonic units of an external telephonic switching network with a plurality of internal telephonic units of the call distribution system, the improvement comprising:

means for providing the internal telephonic units with ISDN characteristics to make them ISDN internal telephonic units;

means for connecting a two way voice path from one ISDN internal telephonic unit to an existing incoming telephonic call between one external telephonic unit and another ISDN internal telephonic unit to create a conference call; and means responsive to the connecting means for indicating at the other ISDN internal telephonic unit of the creation of the two way voice path connection from the one ISDN internal telephonic unit with the existing incoming telephonic call connection.

26. In an automatic call distribution system with a computer controlled multiport switch for selectively interconnecting a plurality of external telephonic units of an external telephonic switching network with a plurality of internal telephonic units of the call distribution system, a method of making ISDN compatible call connections with the internal telephonic units, comprising the steps of:

providing the internal telephonic units with ISDN characteristics to make them ISDN internal telephonic units;

connecting a two way voice path from one ISDN internal telephonic unit to an existing incoming telephonic call between one external telephonic unit and another ISDN internal telephonic unit to create a conference call; and indicating at the other ISDN internal telephonic unit of creation of the two way voice path connection from the one ISDN internal telephonic unit to the existing incoming telephonic call connection.

27. In an automatic call distribution system having a switch for selectively interconnecting a plurality of external telephonic units of an external telephonic switching network with a plurality of internal telephonic units of the call distribution system, the improvement comprising:

means for providing the internal telephonic units with ISDN characteristics to make them ISDN internal telephonic units;

means for connecting multiple parties to an ISDN internal telephonic unit to establish a multiple party conference call at the ISDN internal telephonic unit between the ISDN internal telephonic unit, the external telephonic units and other ISDN internal telephonic units; and means responsive to actuation of a single key at the ISDN internal telephonic unit for disconnecting all the connected parties to the ISDN internal telephonic unit.

28. In an automatic call distribution system having a switch for selectively interconnecting a plurality of external telephonic units of an external telephonic switching network with a plurality of internal telephonic units of the call distribution system, a method of making ISDN compatible call connections with the internal telephonic units, comprising the steps of:

providing the internal telephonic units with ISDN characteristics to make them ISDN internal telephonic units;

connecting multiple parties to one ISDN internal telephonic unit to establish a multiple party conference call at the one ISDN internal telephonic unit between the one ISDN internal telephonic unit, external telephonic units and other ISDN internal telephonic units; and disconnecting all the connected parties to the one ISDN internal telephonic unit in response to actuation of a single key at the one ISDN internal telephonic unit.

29. In an automatic call distribution system having a multiport switch for selectively interconnecting a plurality of external telephonic units of an external network with internal telephonic units of the automatic call distribution system, the improvement comprising:

means for providing an internal telephonic unit with ISDN characteristics to make it an ISDN internal telephonic unit;

means for automatically preventing the activation of a ringer at the ISDN internal telephonic unit;

means for detecting that the ISDN internal telephonic unit is in an unavailable state; and means for activating the ringer in response to receipt of a telephonic call from the multiport switch to the ISDN internal telephonic unit in the unavailable state.

30. In an automatic call distribution system having a multiport switch for selectively interconnecting a plurality of external telephonic units of an external telephonic network with internal telephonic units of the automatic call distribution system, a method of making ISDN compatible call connections with the internal telephonic units, comprising the steps of:

providing the internal telephonic units with ISDN characteristics to make them ISDN internal telephonic units;

preventing the activation of a ringer at an internal telephonic unit;

detecting that the internal telephonic unit is in an unavailable state; and activating the ringer in response to receipt of a telephonic call from the multiport switch to the internal telephonic unit in the unavailable state.

* * * * *